(12) United States Patent
Kielstra

(10) Patent No.: US 8,402,429 B2
(45) Date of Patent: Mar. 19, 2013

(54) GENERATING OBJECT CODE THAT USES CALCULATED CONTENTS FOR A VARIABLE DETERMINED FROM A PREDICATE

(75) Inventor: Allan H. Kielstra, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/856,302

(22) Filed: Aug. 13, 2010

(65) Prior Publication Data

US 2011/0055808 A1 Mar. 3, 2011

(30) Foreign Application Priority Data

Aug. 27, 2009 (CA) .................................... 2675680

(51) Int. Cl.
*G06F 9/44* (2006.01)
*G06F 9/45* (2006.01)
(52) U.S. Cl. .................. 717/108; 717/155; 717/156
(58) Field of Classification Search .................. None
See application file for complete search history.

(56) References Cited

U.S. PATENT DOCUMENTS

| | | | | |
|---|---|---|---|---|
| 5,586,329 A | * | 12/1996 | Knudsen et al. | 717/108 |
| 5,836,014 A | * | 11/1998 | Faiman, Jr. | 717/156 |
| 5,920,716 A | | 7/1999 | Johnson et al. | |
| 5,923,883 A | * | 7/1999 | Tanaka et al. | 717/156 |
| 5,943,499 A | * | 8/1999 | Gillies et al. | 717/155 |
| 7,350,061 B2 | | 3/2008 | Gillies et al. | |
| 8,296,748 B2 | * | 10/2012 | Cheng et al. | 717/156 |
| 2005/0022161 A1 | * | 1/2005 | Burger et al. | 717/108 |
| 2005/0060696 A1 | * | 3/2005 | Bicsak et al. | 717/156 |
| 2007/0294663 A1 | * | 12/2007 | McGuire et al. | 717/108 |
| 2008/0109471 A1 | | 5/2008 | Subbian et al. | |
| 2009/0049437 A1 | | 2/2009 | Woersching et al. | |
| 2009/0064112 A1 | | 3/2009 | Inagaki et al. | |
| 2009/0125893 A1 | | 5/2009 | Copeland et al. | |
| 2010/0023931 A1 | * | 1/2010 | Cheng et al. | 717/156 |

OTHER PUBLICATIONS

Aho, Alfred V.; Sethi, Ravi; and Ullman, Jeffery D., Compilers: Principles, Techniques, and Tools c.1986 Reprinted Mar. 1988 Addison-Wesley pp. 608-623.*
Wegman, Mark; and Zadeck, F., Constant Propagation with Conditional Branches, [Online] 1991, [Retrived from Interent on Oct. 25, 2012], < http://delivery.acm.org/10.1145/110000/103136/p181-wegman.pdf>.*

(Continued)

*Primary Examiner* — Thuy Dao
*Assistant Examiner* — Ravi K Sinha
(74) *Attorney, Agent, or Firm* — A. Bruce Clay

(57) ABSTRACT

In an embodiment, a predicate condition that compares a predicate variable to a compared value is determined. The predicate condition is in a predicate block that exists on a path to a current block that accesses a current variable. A decision is made whether the current variable and the predicate variable are defined by a sub-clique and whether a member of the sub-clique sets the predicate variable to a predicate value that causes control flow to take the path from the predicate block to the current block. Upon a determination that the current variable and the predicate variable are defined by the sub-clique and the member of the sub-clique sets the predicate variable to the predicate value that causes control flow to take the path from the predicate block to the current block, then contents for the current variable are calculated and first object code is generated, which loads the contents.

20 Claims, 15 Drawing Sheets

OTHER PUBLICATIONS

Briggs, P.; Torczon, L.; and Cooper, K., Using Conditional Branches to Improve Constant Propagation, [Online] Apr. 1995, [Retrieved from the Internet on Oct. 25, 2012], <http://citeseerx.ist.psu.edu/viewdoc/download?doi=10.1.1.51.4355&rep=rep1&type=pdf>.*

Binkley, David, Interprocedural Constant Propagation using Dependence Graphs and a Data-Flow Model, [Online] 1994, [Retrieved from the Internet on Oct. 25, 2012], <http://www.springerlink.com/content/7t2ll323487007q6/fulltext.pdf>.*

* cited by examiner

PROGRAM SOURCE CODE 150-1

STATEMENT NUMBER    STATEMENT

```
                    MAIN {}                          205-1
                    {                                BLOCK K
I5                      I = 0

IF B = 2 THEN

I6                          I = 10                   205-2
I7                          J = 20                   BLOCK L

ELSE                         205-3
I8                          J = 30                   BLOCK M

Z = 2                        BLOCK N 205-4
                        Z = B + 2

IF I = 10 THEN               BLOCK O 205-5

I9                          V = J + 2                BLOCK P 205-6

ELSE                         BLOCK Q
I10                         V = I + 1                205-7

}                                BLOCK R 205-8
```

FIG. 2

| | | | 156-17 |
|---|---|---|---|
| IN-SETS | | | |

| BLOCK (605) | VARIABLE (610) | DESIGNATED INSTRUCTION IN THE SUB-CLIQUE(S) THAT SETS THE VARIABLE (615) | SUB-CLIQUE(S) THAT SET THE VARIABLE (620) |
|---|---|---|---|
| BLOCK K | I | NONE | { } |
| BLOCK K | J | NONE | { } |
| BLOCK L | I | I5 | {I5} |
| BLOCK L | J | NONE | { } |
| BLOCK M | I | I5 | {I5} |
| BLOCK M | J | NONE | { } |
| BLOCK N | I | I5, I6 | {I5}, {I6,I7} |
| BLOCK N | J | I8, I7 | {I8}, {I6, I7} |
| BLOCK O | I | I5, I6 | {I5}, {I6,I7} |
| BLOCK O | J | I8, I7 | {I8}, {I6, I7} |
| BLOCK P | I | I6 | {I6,I7} |
| BLOCK P | J | I7 | {I6, I7} |
| BLOCK Q | I | I5 | {I5} |
| BLOCK Q | J | I8 | {I8} |

FIG. 6

OUT-SETS 156-18

| BLOCK | VARIABLE | DESIGNATED INSTRUCTION IN THE SUB-CLIQUE(S) THAT SETS THE VARIABLE | SUB-CLIQUE(S) THAT SET THE VARIABLE |
|---|---|---|---|
| BLOCK K | I | {I5} | {I5} |
| BLOCK K | J | { } | { } |
| BLOCK L | I | {I6} | {I6, I7} |
| BLOCK L | J | {I7} | {I6, I7} |
| BLOCK M | I | {I5} | {I5} |
| BLOCK M | J | {I8} | {I8} |
| BLOCK N | I | {I5, I6} | {I5}, {I6,I7} |
| BLOCK N | J | {I8, I7} | {I8}, {I6, I7} |
| BLOCK O | I | {I5, I6} | {I5}, {I6,I7} |
| BLOCK O | J | {I8, I7} | {I8}, {I6, I7} |
| BLOCK P | I | {I6} | {I6,I7} |
| BLOCK P | J | {I7} | {I6, I7} |
| BLOCK Q | I | {I5, I6} | {I5} |
| BLOCK Q | J | {I8, I7} | {I8} |

FIG. 7

GENERATING OBJECT CODE THAT USES CALCULATED CONTENTS FOR A VARIABLE DETERMINED FROM A PREDICATE

CROSS-REFERENCE TO RELATED APPLICATIONS

The present application claims the benefit of Canadian Application No. 2675680 filed on Aug. 27, 2009, which is incorporated herein by reference.

BACKGROUND

An embodiment of the invention generally relates to compilers and more particular relates to generating object code that uses calculated contents for a current variable determined from a definition of a predicate variable.

Computer systems typically include a combination of computer hardware (such as semiconductors, circuit boards, processors, and storage devices) and computer programs. The computer programs are stored in the storage devices and are executed by the processors. Computers are often general purpose, meaning that the functions that the computer performs on the data may be altered by altering the computer programs that execute on the computer.

Human programmers often write computer programs in a form of computer language, called source code, that is relatively easy for a human to understand, but which is not efficient or possible for the processor to execute. Another program, called a compiler, then transforms or translates the source code into a form, often called object code, which is more efficient or possible for the processor in the computer to execute, but relatively difficult for a human to understand.

A type of compiler, called an optimizing compiler, attempts to analyze the statements or instructions within the program in order to produce object code that will execute faster or use less memory. Techniques for optimizing the object code include avoiding redundancy by reusing results that have already been computed and storing them for later use instead of re-computing them, removing unnecessary computations and intermediate values, placing code and data that are accessed closely together in time close together in memory, re-ordering instructions to allow multiple computations to happen in parallel, combining the body of loops that iterate the same number of times if they make no reference to each other's data, moving calculations that compute the same value for each iteration from inside the loop to outside the loop, and replacing expressions consisting of constants with their final value at compile-time, rather than performing the calculation at run-time, among others.

In order to implement optimization, the compiler needs information about the code, and the more precise the information, the better optimizations the compiler can make. One technique for obtaining information about the code is called data flow analysis, which determines how data values are propagated within the program.

BRIEF SUMMARY

In an embodiment, object code that uses calculated contents for a current variable determined from a definition of a predicate variable is generated. A predicate condition that compares a predicate variable to a compared value is determined, where the predicate condition is in a predicate block that exists on a path to a current block that accesses a current variable. A decision is made whether the current variable and the predicate variable are defined by a same sub-clique and whether a member of the same sub-clique sets the predicate variable to a predicate value that causes control flow to take the path from the predicate block to the current block. If the current variable and the predicate variable are defined by the same sub-clique and the member of the same sub-clique sets the predicate variable to the predicate value that causes control flow to take the path from the predicate block to the current block, then calculated contents for the current variable are calculated and first object code is generated, which loads the calculated contents.

In an embodiment, object code that uses calculated contents for a current variable determined from a definition of a predicate variable is generated. A computer-readable storage medium is encoded with instructions so that when executed by a processor a predicate condition that compares a predicate variable to a compared value is determined, and wherein the predicate condition is in a predicate block that exists on a path to a current block that accesses a current variable. It is decided whether the current variable and the predicate variable are defined by a same sub-clique and whether a member of the same sub-clique sets the predicate variable to a predicate value that causes control flow to take the path from the predicate block to the current block. If the current variable and the predicate variable are defined by the same sub-clique, and the member of the same sub-clique sets the predicate variable to the predicate value that causes control flow to take the path from the predicate block to the current block, contents for the current variable are calculated and the first object code that loads the calculated contents are generated.

In an embodiment, a computer system generates object code that uses calculated contents for a current variable determined from a definition of a predicate variable using a processor and memory connected to the processor. The memory is encoded with instructions. When the instructions are executed a predicate condition that compares a predicate variable to a compared value is determined. The predicate condition is in a predicate block that exists on a path to a current block that accesses a current variable. It is decided whether the current variable and the predicate variable are defined by a same sub-clique and whether a member of the same sub-clique sets the predicate variable to a predicate value that causes control flow to take the path from the predicate block to the current block. The same sub-clique comprises a plurality of load value instructions, wherein one of the load value instructions defining contents of its variable implies that all of the load value instructions define respective contents of their respective variables. If the current variable and the predicate variable are defined by the same sub-clique and the member of the same sub-clique sets the predicate variable to the predicate value that causes control flow to take the path from the predicate block to the current block, contents for the current variable are calculated and first object code that loads the calculated contents are generated.

BRIEF DESCRIPTION OF THE SEVERAL VIEWS OF THE DRAWINGS

FIG. 2 depicts a block diagram of example source code, according to an embodiment of the invention;

FIG. 6 depicts a block diagram of an example data structure for in-sets, according to an embodiment of the invention;

FIG. 7 depicts a block diagram of an example data structure for out-sets, according to an embodiment of the invention;

DETAILED DESCRIPTION

Figure 1:
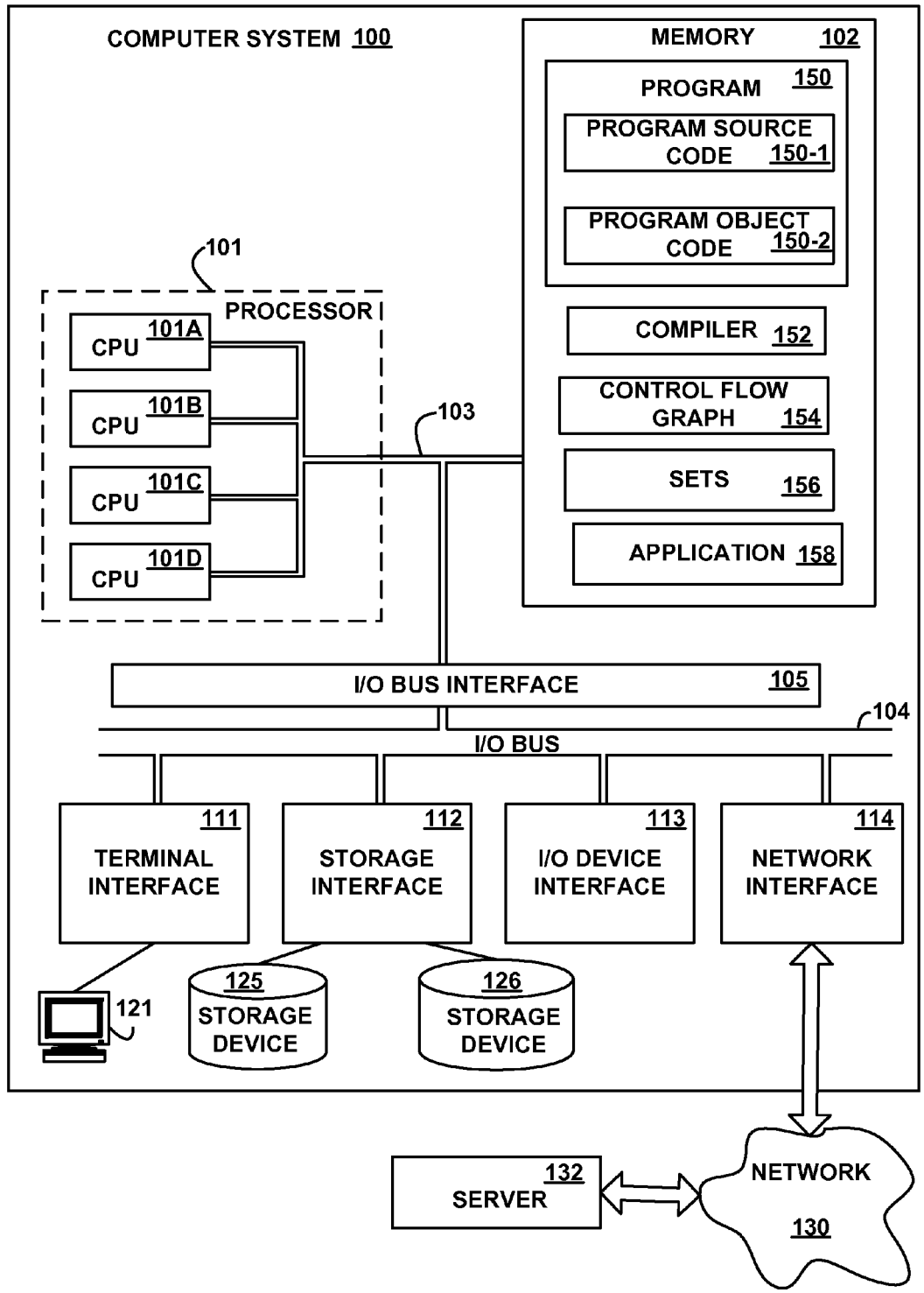
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected via a network 130 to a computer system (server) 132, according to an embodiment of the present invention. The major components of the computer system 100 include one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a program 150, a compiler 152, a control flow graph 154, sets 156, and an application 158. Although the program 150, the compiler 152, the control flow graph 154, the sets 156, and the application 158 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the program 150, the compiler 152, the control flow graph 154, the sets 156, and the application 158 are illustrated as being contained within the main memory 102, these elements are not necessarily all completely contained in the same storage device at the same time. Further, although the program 150, the compiler 152, the control flow graph 154, the sets 156, and the application 158 are illustrated as being separate entities, in other embodiments some of them, portions of some of them, or all of them may be packaged together.

The program 150 includes a source code version 150-1 and an object code version 150-2. The program source code 150-1 is a version of the program 150 that includes text written in a computer language (the source language). The program object code 150-2 is a version of the program 150 that is expressed in another computer language (the target language). The compiler 152 is a computer program (or set of programs) that translates (or compiles) the program source code 150-1 into the program object code 150-2. In an embodiment, the program object code 150-2 is in a form suitable for processing by other programs (e.g., a linker) and may be expressed as assembly language or machine language that executes on the processor 101. In an embodiment, the compiler 152 performs some or all of lexical analysis of the program, parsing of the program, semantic analysis of the program, code generation of the program object code 150-2, and optimization of the program object code 150-2. In an embodiment, the compiler 152 is a stand-alone compiler, but in another embodiment, the compiler 152 is a just-in-time (JIT) compiler that operates as a portion of an interpreter.

The compiler 152 further creates the control flow graph 154 and the sets 156 from the program 150. The control flow graph 154 is a representation, using graph notation, of all execution paths that are possible for the program 150 to traverse during the execution of the program 150 on the processor 101.

In an embodiment, one or both of the compiler 152 and the application 158 include instructions or statements capable of executing on the processor 101 or instructions or statements capable of being interpreted by instructions or statements that execute on the processor 101, to carry out the functions as further described below with reference to FIGS. 9, 10, 11, 12, 13, 14, and 15. In an embodiment, one or both of the compiler 152 and the application 158 are implemented in hardware via semiconductor devices, chips, logical gates, circuits, circuit cards, and/or other physical hardware devices in lieu of, or in addition to, a processor-based system. In an embodiment, one or both of the compiler 152 and the application 158 may also include data in addition to instructions or statements.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user terminals 121, which may include user output devices (such as a video display device, speaker, and/or television set) and user input devices (such as a keyboard, mouse, keypad, touchpad, trackball, buttons, light pen, or other pointing device). A user may manipulate the user input devices, in order to provide input to the user terminal 121 and the computer system 100 via a user interface, and may receive output via the user output devices. For example, a user interface may be presented via the user terminal 121, such as displayed on a display device, played via a speaker, or printed via a printer. In various embodiments, the display device may be a CRT (Cathode Ray Tube), LCD (Liquid Crystal Display), or any other type of display technology.

The storage interface unit 112 supports the attachment of one or more direct access storage devices (DASD) 125 and 126 (which are typically rotating magnetic disk drive storage devices, although they could alternatively be other devices, including arrays of disk drives configured to appear as a single large storage device to a host). In another embodiment, the devices 125 and/or 126 may be implemented via any type of secondary storage device. The contents of the main memory 102, or any portion thereof, may be stored to and retrieved from the direct access storage devices 125 and 126, as needed.

The I/O device interface 113 provides an interface to any of various other input/output devices or devices of other types, such as printers or fax machines. The network adapter 114 provides one or more communications paths from the computer system 100 to other digital devices and computer systems 132; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a desktop computer, portable computer, laptop or notebook computer, tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be any appropriate cellular data network or cell-based radio network technology. In another embodiment, the network 130 may be a wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100, the network 130, and the computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100, and that, when read and executed by one or more processors in the computer system 100 or when read and interpreted by instructions that execute on the one or more processors, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible and computer-readable signal-bearing media that may be operatively or communicatively connected (directly or indirectly) to the processor or processors, such as the processor 101. The computer-readable signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., the disk 125 or 126), the main memory 102, CD-RW, or diskette; or (3) information conveyed by a communications medium, such as through a computer or a telephone network, e.g., the network 130.

Such tangible storage media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of the invention.

FIG. 2 depicts a block diagram of example source code 150-1, according to an embodiment of the invention. In various embodiments, the program source code 150-1 includes, or is divided into, one or more routines, subroutines, procedures, methods or functions. The example source code 150-1 illustrated in FIG. 2 includes one function, which is named "main." The program source code 150-1 illustrates a variety of statements or instructions of the program 150, which are identified by statement numbers. The statements are organized and divided into basic blocks 205-1, 205-2, 205-3, 205-4, 205-5, 205-6, 205-7, and 205-8.

A basic block is a unit of a function of the program 150 that includes one or more statements or instructions, such as the statements having statement numbers I5, I6, I7, I8, I9, and I10. A basic block has only one entry point (i.e., no code within the basic block is the destination of a jump, call, or other control flow instruction), one exit point (i.e., control flow leaves the basic block via only one instruction or statement), and the basic block contains no jump instructions or other control flow statements (other than the possible exception of the last instruction in the basic block).

The basic block 205-1 represents the entry of the main function, and the basic block 205-8 represents the return of the main function. Every function in a program includes a basic block that represents the entry point of the function and another that represents the return. The start of a basic block may be jumped to, from more than one location within this or another function. The entry basic block may be jumped to by other functions in this or other programs. In various embodiments, the end of a basic block is a jump instruction or is the statement or instruction immediately before or prior to the destination of a jump instruction. Basic blocks are often the units to which compiler 152 optimizations are applied. Basic blocks form the vertices or nodes in the control flow graph 154. In various embodiments, code may be source code, assembly code, executable instructions, interpretable statements, or any other type of code sequence.

To more formally define a basic block, a sequence of instructions forms a basic block if the instruction in each position in the sequence dominates, or always executes before, all those instructions in later (later in execution time within the control flow) positions within the sequence, and no other instruction executes between two instructions in the sequence. Thus, a basic block is allowed to include unconditional jumps to statements that are not targeted by other jumps within the basic block. The basic blocks to which control may next transfer on a path after reaching the end of a basic block are called that basic block's successors, and the basic blocks from which control on a path might have come when entering a basic block are called that basic block's predecessors. (A basic block's predecessors are defined to be its immediate predecessors, meaning that no intervening block exists between a basic block and its predecessor block(s).) Predecessor and successor blocks are defined by the possibility of flow control transfer, not actual flow control transfer during execution, since the actual path of control flow might not be capable of being determined by the compiler 152 until the program 150 is executed on the processor 101.

In an embodiment, the compiler 152 generates basic blocks by reading the program 150 and marking basic block boundaries, which are the instructions that (if and when executed) either begin or end a basic block because those instructions either transfer control or accept control from another point or location within the program 150. Then, the compiler 152 cuts the program 150 listing at each of these points, and the basic blocks are the sequence of instructions between each of these points.

In various embodiments, instructions that end a basic block include unconditional and conditional branches or jumps (both direct and indirect); returns to a calling procedure; instructions that might throw, cause, or generate an exception, cause an interrupt, or generate an error; or function calls that might not return (such as functions that throw or generate exceptions, interrupts, or errors). In various embodiments, instructions that begin a new basic block include procedure and function entry points, targets of jumps or branches, fall-through instructions following conditional branches, instructions following other instructions that throw or generate exceptions, and exception handlers.

Figure 3:
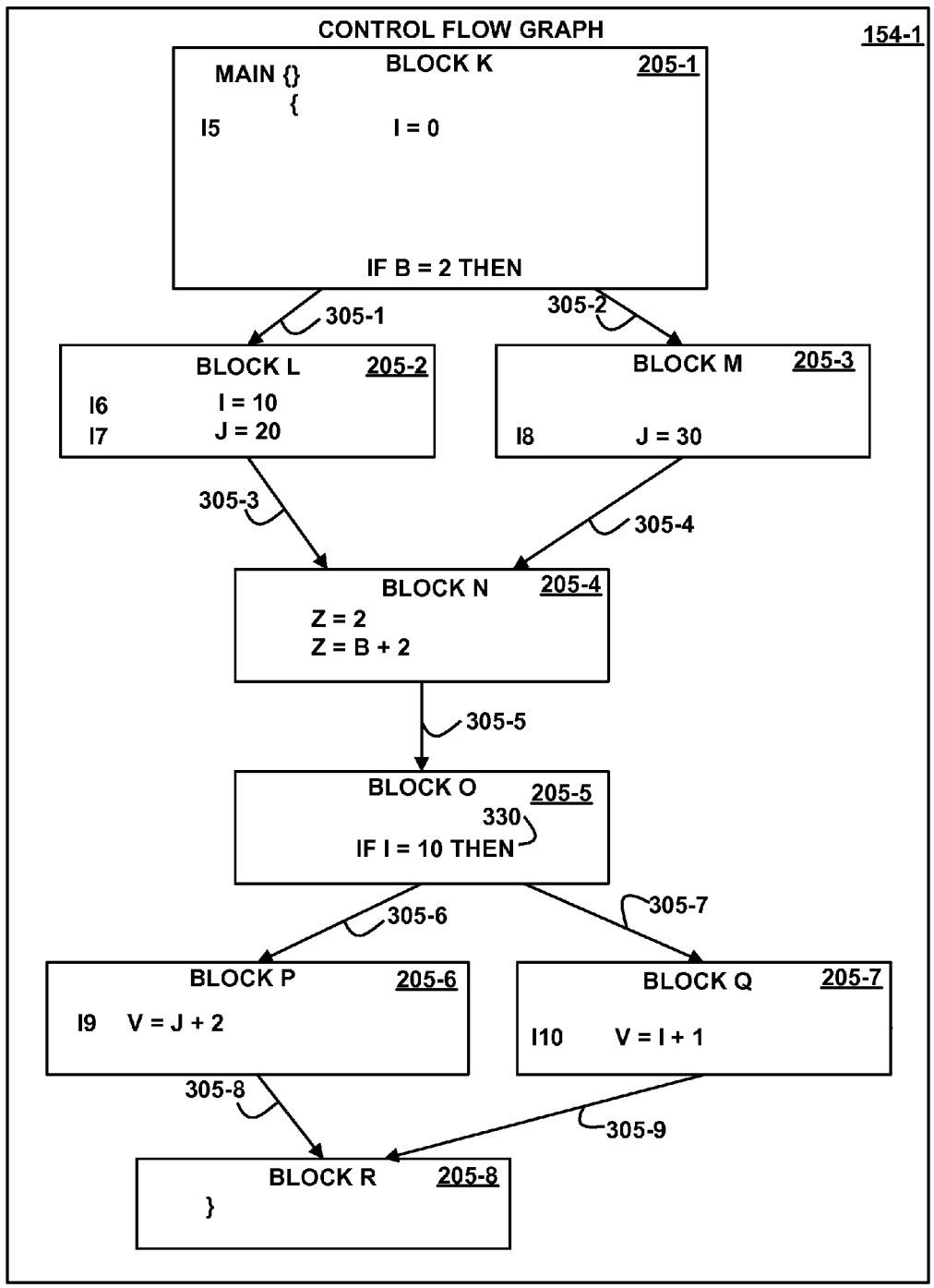
FIG. 3 depicts a block diagram of an example control flow graph, according to an embodiment of the invention.

FIG. 3 depicts a block diagram of an example data structure for a control flow graph 154-1, according to an embodiment of the invention. The control flow graph 154-1 is an example of the control flow graph 154 (FIG. 1). The control flow graph 154-1 is a representation, using the graph notation of nodes and directed edges, of all execution paths through the basic blocks 205-1, 205-2, 205-3, 205-4, 205-5, 205-6, 205-7, and 205-8 (represented by nodes in the control flow graph) of the program that are possible for the execution of the program (when executed on the processor 101) to traverse. Each node in the control flow graph 154-1 represents a basic block in the program 150. The directed edges 305-1, 305-2, 305-3, 305-4, 305-5, 305-6, 305-7, 305-8, and 305-9 between the basic blocks represent changes in the control flow of the program 150 caused by control flow statements in the program. Directed edges have an associated direction, meaning that the flow of control of the basic blocks flows from the node at the tail of the directed edge to the node pointed to by the head of the directed edge, but the flow of control does not flow from the node pointed to by the head to the node at the tail.

Control flow (or alternatively, flow of control) refers to the order in which the basic blocks and the order in which the individual statements, instructions and/or function calls of the basic blocks are executed by the processor 101. A control flow statement is an instruction that, when executed, can cause (conditionally or unconditionally) a change in the subsequent control flow to differ from the natural sequential order (i.e., from beginning to end or top to bottom), in which the instructions in the basic blocks are listed within the program 150. The types of control flow statements available differ between programming languages, but may be categorized by their effect on the order of the basic blocks as follows:

1) a statement that causes flow control to continue at a different statement (a jump);

2) a statement that causes a set of statements to be executed only if a condition is met or an expression evaluates to true (a choice or condition);

3) a statement that causes a set of statements to be executed zero or more times, until a condition is met or while a condition is met (a loop);

4) a statement that causes a set of distant or separate statements to be executed, after which the flow of control may possibly return (a call or invocation of a subroutine, sub-procedure, method, or another program); and 5) a statement that stops or halts execution of the program, which prevents any further execution of the program, unless and until the execution is restarted.

In an embodiment, control flow statements work (when executed by the processor 101) by altering the program counter used by the processor 101 to determine the next statement or instruction to execute. As used herein, control flow is restricted to a single thread of execution, as it depends upon a definite sequence in which instructions are executed by the processor 101, one at a time.

The compiler 152 creates the control flow graph 154 to represent the possible execution paths because the actual execution path is often dependent on values of data that the program reads when it executes, and the compiler 152 does not necessarily know those values since the compiler 152 creates the control flow graph 154 prior to some or all of the statements of the program being executed. For example, whether block 205-2 or 205-3 is executed depends on the value of the variable "B," which is not known until it is read by the execution of the instructions within the basic block 205-1 and compared against the constant "2" by the execution of the instructions within the basic block 205-1.

The control flow graph 154-1 includes two specially designated basic blocks: the entry basic block 205-1, through which control enters into the control flow graph 154-1, and the exit basic block 205-8, through which all control leaves the control flow graph 154-1. Thus, a path is an alternating sequence of nodes and directed edges that starts at the entry node 205-1 and terminates at the exit node 205-8. Multiple paths may exist in the control flow graph 154 because of the conditional control flow statements.

Figure 4:
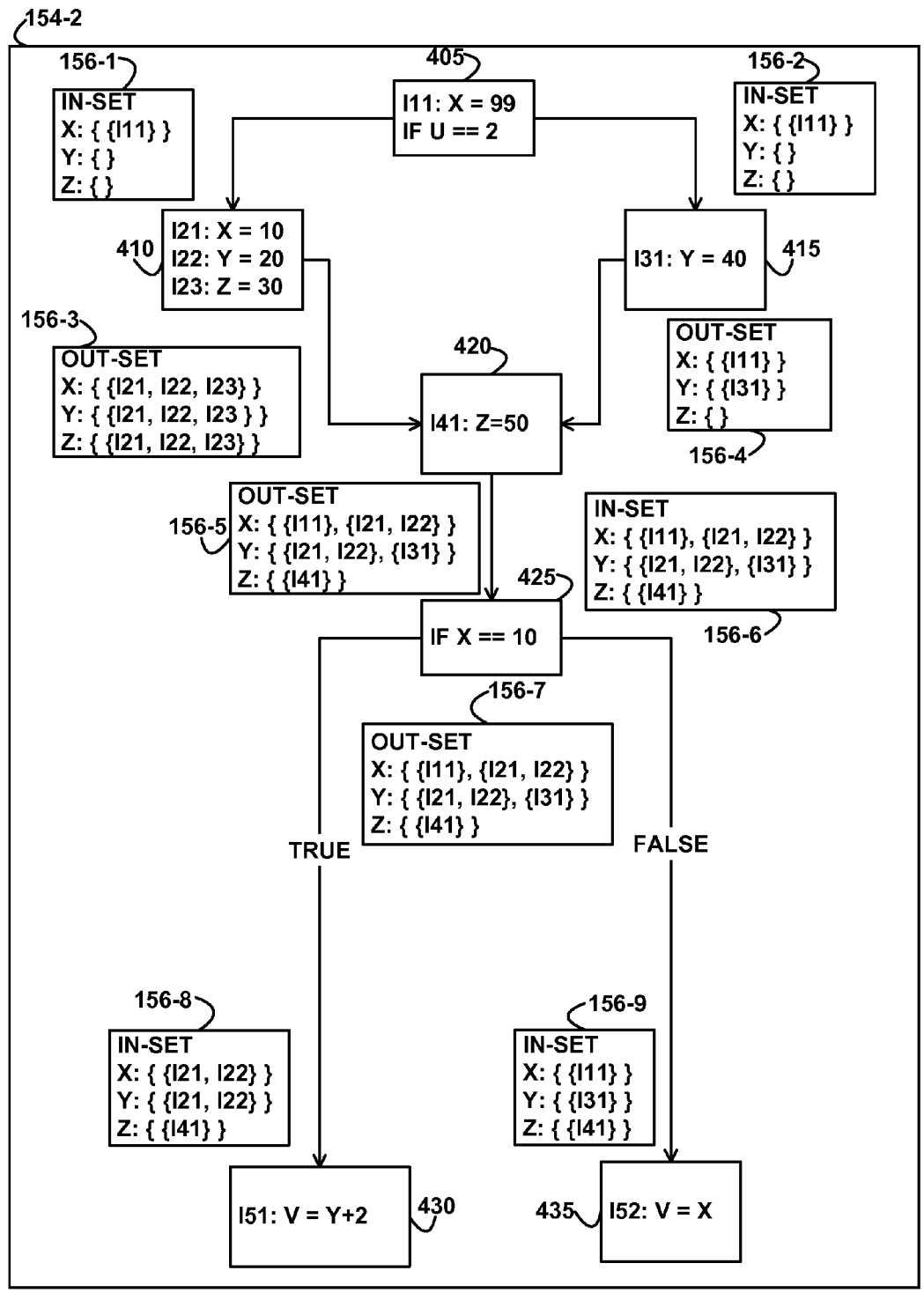
FIG. 4 depicts a block diagram of an example control flow graph with associated in-sets and out-sets, according to an embodiment of the invention.

FIG. 4 depicts a block diagram of an example control flow graph 154-2 with associated in-sets and out-sets, according to an embodiment of the invention. The control flow graph 154-2 is an example of the control flow graph 154 (FIG. 1). The blocks 405, 410, 415, 420, 425, 430, and 435 are examples of basic blocks in the program 150.

The sets 156-1, 156-2, 156-3, 156-4, 156-5, 156-6, 156-7, 156-8, and 156-9 are examples of the sets 156 (FIG. 1). The set 156-1 is the in-set of block 410. The set 156-2 is the in-set of block 415. The set 156-3 is the out-set of block 410. The set 156-4 is the out-set of block 415. The set 156-5 is the out-set of block 420. The set 156-6 is the in-set of block 425. The set 156-7 is the out-set of block 425. The set 156-8 is the in-set of block 430. The set 156-9 is the in-set of block 435. Although the sets are illustrated as being included in the control flow graph 154-2, in another embodiment they are separate from the control flow graph 154-2.

The compiler 152 creates a separate in-set for each basic block in the program 150 and for each variable, memory location, or register accessed by the program 150. The compiler 152 creates a separate out-set for each basic block B and each variable, memory location, or register accessed by the program 150. An in-set of a basic block includes, as its members, the sub-cliques that include instruction(s) that define (store or write) a value to a variable, memory location or register, and that definition reaches the input to the basic block, meaning that it is not overwritten by some other definition on the path from the instruction to the basic block. An out-set of a basic block includes, as its members, the sub-cliques that include instruction(s) that define (store or write) a value to a variable, memory location or register, and that definition reaches the output of the basic block (is not over-written by another definition performed by another instruction, as predicted by the compiler, inside the basic block).

A clique is a set of load value instructions $\{Lv_1, Lv_2, \ldots, Lv_n\}$ [in control flow order from first ($Lv_1$) to last ($Lv_n$)] in the program 150 that meets the following criteria:

1. Each of the instructions (when executed) in the clique defines, loads, stores, or writes a value to a register, variable, or a memory location;
2. The source of the value is a constant, a register, a variable, a memory location, or any combination or multiple thereof, and the result of any arithmetic or register operation performed on any combination or multiple thereof;
3. $Lv_m$ dominates $Lv_{m+1}$, and $Lv_{m+1}$ post-dominates $Lv_m$, for all $1<=m<n$ ($Lv_m$ dominates $Lv_{m+1}$ if and only if all paths from $Lv_1$ to $Lv_{m+1}$ intersect $Lv_m$, and $Lv_{m+1}$ post-dominates $Lv_m$ if and only if all paths from $Lv_m$ to $Lv_n$ intersect $Lv_{m+1}$); and
4. On no path from $Lv_1$ to $Lv_n$ does an instruction invalidate the current value of $Lv_m$ for $1<=m<n$. Thus, the compiler 152 can re-evaluate any of the members of the clique in any order and the result of the evaluation of the members of the clique will not change to a different value. Stated another way, the clique members do not reference, access, or use the result of another clique member. (For example, if the value created to be stored by $Lv_n$ is "evaluate a+b," then no assignment exists on the path from $Lv_1$ to $Lv_n$ to either a or b. If a or b had changed in value, the compiler would not be able to re-evaluate $Lv_n$, subsequently. Instructions that load a constant can be re-evaluated anywhere and thus do not invalidate the current value of $Lv_m$ for $1<=m<n$.)

Thus, if any one load value instruction in a clique defines the contents of its variable, then all load value instructions in that clique also define the respective contents of their respective variables. Further, if any one load value instruction in a clique does not define the contents of its variable, then none of the load value instructions in that clique define the respective contents of their respective variables. Any subset of a clique (including the full clique) is called a sub-clique of load value instructions.

To create the in-sets and the out-sets, the compiler 152 creates a must-def(V) set and uses data flow analysis of the control flow graph 154. Must-def(V) includes as its elements all statements S (or identifiers of statements) in the program 150 that will define or write a value to the contents of the storage location V if and when the statement S is executed. The compiler 152 creates a must-def(V) set for each variable or storage location V that is referenced by a statement or instruction in the program 150. The compiler 152 calculates the must-def(V) sets without knowledge of whether or not the statements S will be executed since the statements S have not executed at the time the compiler 152 creates the must-def(V) sets. The compiler 152 adds to MustDef(v) those assignment statements S (or adds identifications of the assignment statements) in the program 150 that include an assignment target, for all storage locations V used by the program 150.

The compiler 152 uses data flow analysis to create the must-def, the in-sets, and the out-sets for each block in the control flow graph by solving systems of data flow equations. The actual meaning of the dataflow analysis is determined by the specific property that the compiler is determining. The in-sets and out-sets include, for each variable, the set of sub-clique members that may set the variable. As used herein, the in-set or out-set for variable V is denoted as V: {{Sub-Clique1}, {Sub-Clique2}, ... }, meaning that at the basic block program point where the in-set or out-set is relevant, V is set by an instruction in Sub-Clique1 or an instruction in Sub-Clique2, and so forth, if that sub-clique is executed. In each sub-clique, only one member (designated instruction) of the sub-clique actually sets V. The remaining members of the sub-clique set other variables that are also tracked by the compiler in the dataflow in-set/out-set.

In a set (an in-set or an out-set), if a variable is set by a member of a sub-clique, every member of that sub-clique must set a variable in the same set. For example, if instruction I1 sets the variable V1 and instruction I2 sets the variable V2, if I1 and I2 are instructions in a clique, and if, in some data flow set, V1 is set by the I1 member of the sub-clique {I1,I2} then, in that same dataflow set, V2 must be set by the I2 member of the same sub-clique. This property allows the compiler to view the data flow set as either a set of sub-clique members that may assign a value to a variable, as stated above, or as a set of sub-cliques. If a sub-clique is in a particular data flow set, then each member of that sub-clique may assign its corresponding value to its corresponding variable in that data flow set.

A sub-clique member is a specific instruction within a sub-clique. In a data flow set, if a variable may be set by a sub-clique member (as predicted by the compiler 152), then all members of the same sub-clique must appear in the in-set. For example, in the out-set 156-5, x is set by a member of the sub-clique {I21, I22} (if the instructions in the sub-clique {I21, I22} are executed). Thus, the compiler includes {I21, I22} in the set of possible assignments to x.

In block 420, instruction I41 defines the variable "z" with the constant value "50." This definition of the variable "z" by the instruction I41 causes the compiler 152 to change the out-set 156-5 (of block 420) for the variables "x" and "y" to remove the instruction I23 from the in-set sub-clique of x: {{$I_{21}$, $I_{22}$, $I_{23}$}} when creating the out-set sub-cliques x: {{$I_{11}$}, {$I_{21}$, $I_{22}$}} and y: {{$I_{21}$, $I_{22}$}, {$I_{31}$}} because after the block 420 executes (as predicted by the compiler), x: {{$I_{21}$, $I_{22}$, $I_{23}$}} no longer meets the definition of a clique because if instruction I21 defines the contents of the variable "x," it is no longer true that instruction I23 defines the contents of the variable "z" because instruction I41 in block 420 now defines the contents of the variable "z."

The compiler 152 changes the out-set 156-7 of block 425 to the in-set 156-8 of block 430 because the only definition of the variable "x" that sets "x" to the constant "10" is in the sub-clique {$I_{21}$, $I_{22}$}, so the definitions caused by the instructions in that sub-clique must reach the block 430 because block 430 is on the "true" leg of block 425, which contains the conditional predicate "x==10." Since the definitions caused by the sub-clique {$I_{21}$, $I_{22}$} must reach the in-set 156-8 and the sub-clique {$I_{21}$, $I_{22}$} also defines the contents of the variable "y," the definition of the variable "y" in the sub-clique {$I_{21}$, $I_{22}$} must also reach the block 430, so the compiler 152 removes the sub-cliques {$I_{11}$} and {$I_{31}$}, for the respective variables "x" and "y" (since {$I_{11}$} and {$I_{31}$} cannot possibly define "x" and "y") from the out-set 156-7 to create the in-set 156-8.

For every variable in the program 150, the compiler 152 creates a distinguished clique consisting of a virtual instruction that sets a variable to an unknown value, representing the fact that until the compiler encounters an explicit definition of a variable, the compiler does not know the contents of a variable.

Figure 5:
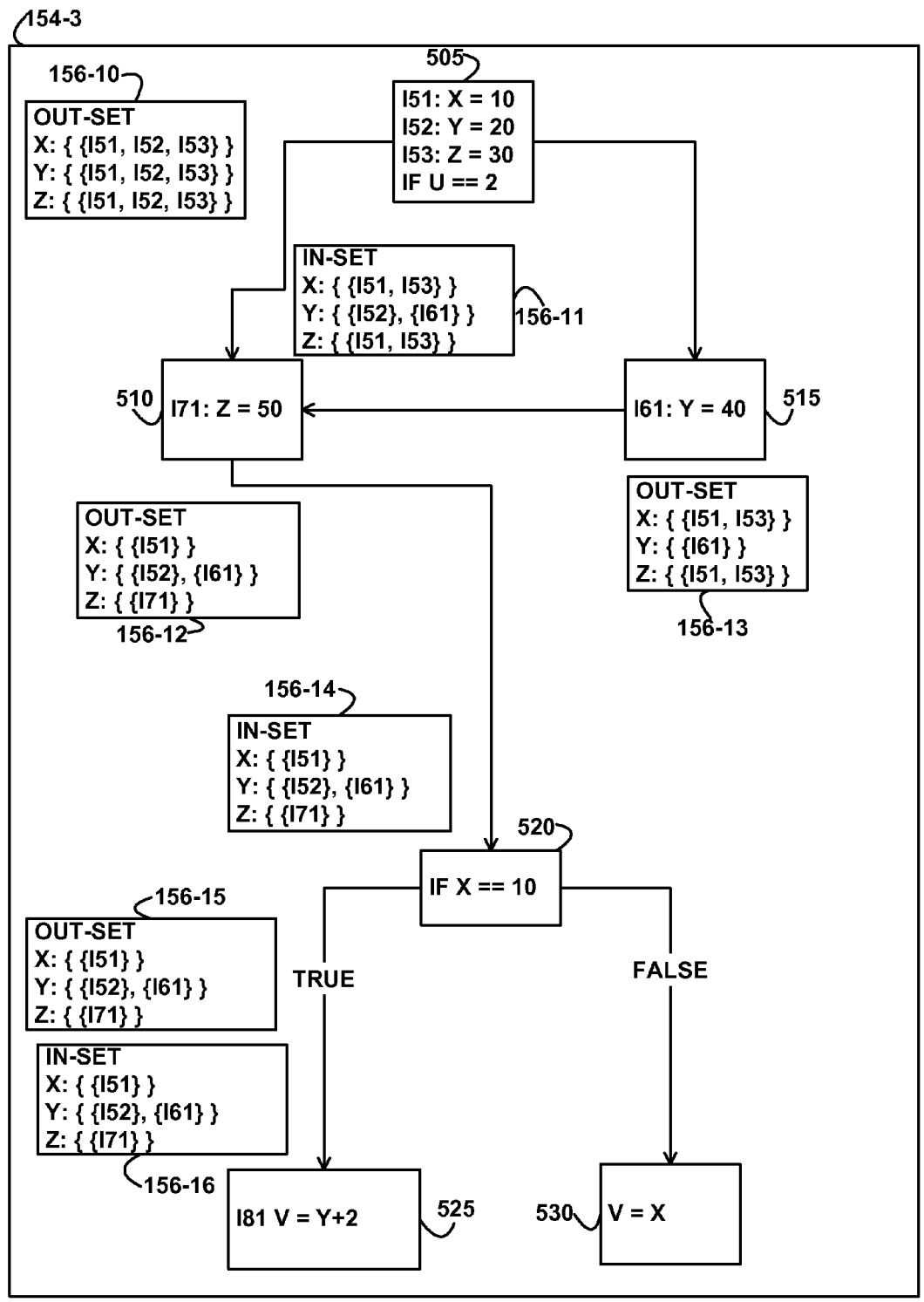
FIG. 5 depicts a block diagram of another example control flow graph with associated in-sets and out-sets, according to an embodiment of the invention.

FIG. 5 depicts a block diagram of another example control flow graph 154-3 with associated in-sets and out-sets, according to an embodiment of the invention.

The control flow graph 154-3 is an example of the control flow graph 154 (FIG. 1). The blocks 505, 510, 515, 520, 525, and 530 are examples of basic blocks in the program 150.

The sets 156-10, 156-11, 156-12, 156-13, 156-14, 156-15, and 156-16 are examples of the sets 156 (FIG. 1). The set 156-10 is the out-set of block 505. The set 156-11 is the in-set of block 510. The set 156-12 is the out-set of block 510. The set 156-13 is the out-set of block 515. The set 156-14 is the in-set of block 520. The set 156-15 is the out-set of block 520. The set 156-16 is the in-set of block 525. Although the sets are illustrated as being included in the control flow graph 154-3, in another embodiment they are separate from the control flow graph 154-3.

The compiler 152 creates the in-set 156-11 for block 510 from the interaction of the out-sets 156-10 and 156-13 of the two predecessor blocks 505 and 515 of block 510 to create the in-set 156-11 for block 510, as further described below with reference to FIG. 11.

FIG. 6 depicts a block diagram of an example data structure for in-sets 156-17, according to an embodiment of the invention. The in-sets 156-17 are examples of the in-sets 156 (FIG. 1) and represent the in-sets of the basic blocks of FIG. 3. The example in-sets 156-17 are illustrated as implemented by records, each record representing an in-set to a block 605 for a variable 610 that is set by a designated instruction 615 of a sub-clique 620.

The block 605 identifies a basic block in the program. The variable 610 identifies or represents a variable, memory location, or register that is accessed, defined, or written to by the program when the program executes. The sub-cliques 620 are sub-cliques in the program, and the sub-cliques have instructions, statements, or identifiers of instructions or statements as their members. The designated instructions 615 identify the member(s) in the sub-cliques 620 that define, set, write, or store a value to the variable (if the sub-clique is executed), and that value reaches or will still exist in the variable at the time that control flow enters the block 605 (if the sub-clique 620 is executed).

FIG. 7 depicts a block diagram of an example data structure for out-sets 156-18, according to an embodiment of the invention. The out-sets 156-18 are examples of the out-sets 156 (FIG. 1) and represent the out-sets of the basic blocks of FIG. 3. The example out-sets 156-18 are illustrated as implemented by records, each record representing an out-set to a block 705 for a variable 710 that is set by a designated instruction 715 (a member) of a sub-clique 720.

The block 705 is a basic block in the program. The variable 710 represents a memory location or register whose contents are accessed, set, defined, or written to by the program when the program executes. The sub-cliques 720 are sub-cliques in the program, and the sub-cliques have instructions, statements, or identifiers of instructions or statements as their members. The designated instructions 715 identify the instruction member(s) in the sub-cliques 720 that define, set, write, or store a value to the variable (if the sub-clique is executed), and that value reaches or will still exist in the variable at the time that control flow exits the block 705 (if the sub-clique 720 is executed).

Figure 8:
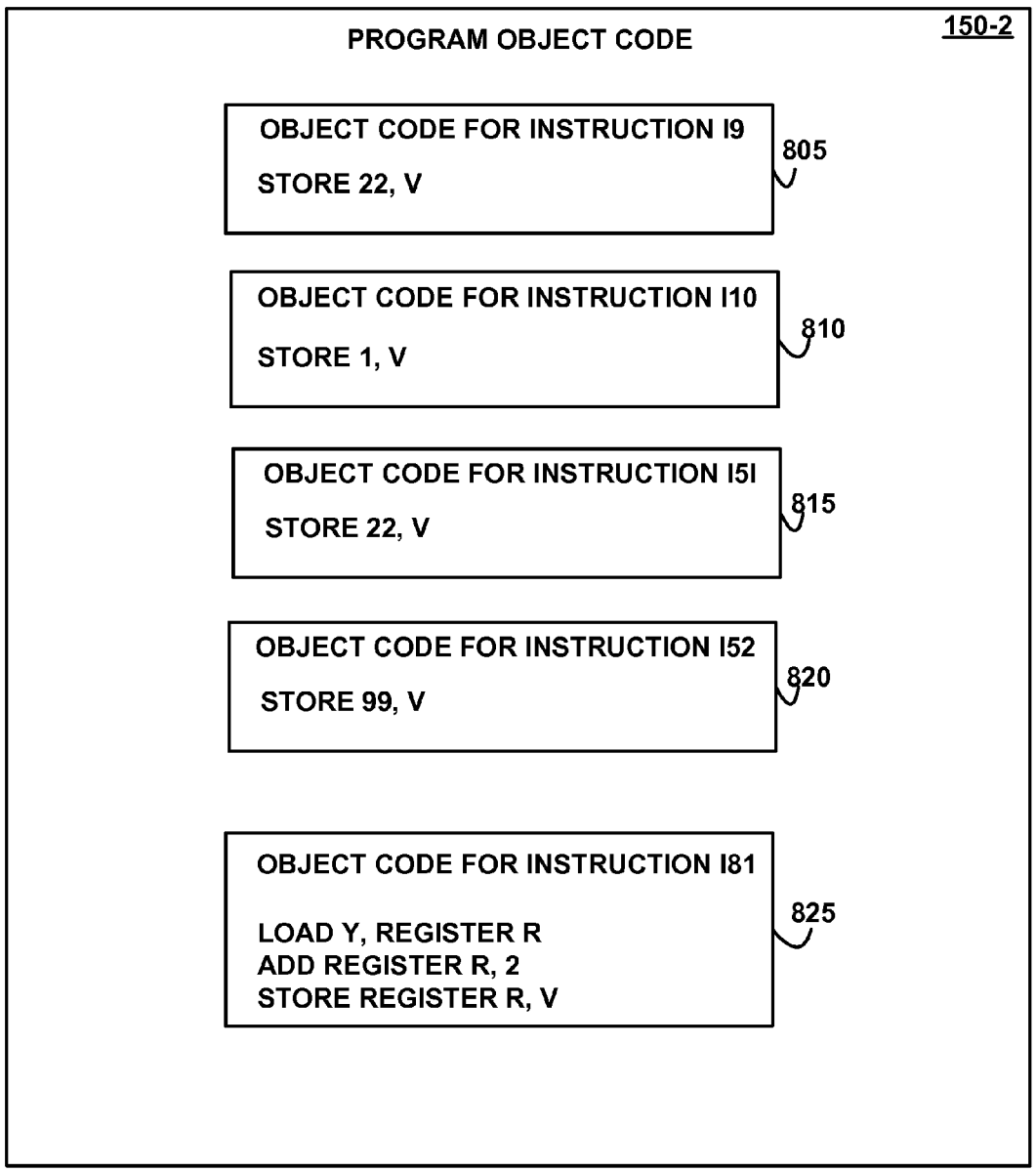
FIG. 8 depicts a block diagram of example object code generated by a compiler, according to an embodiment of the invention.

FIG. 8 depicts a block diagram of example object code 150-2 generated by a compiler 152, according to an embodiment of the invention. The example object code 150-2 includes example object code 805, which the compiler 152 generated to implement the instruction 19 in FIG. 3. The example object code 150-2 further includes example object code 810, which the compiler 152 generated to implement the instruction I10 in FIG. 3. The example object code 150-2 further includes example object code 815, which the compiler 152 generated to implement the instruction 151 in FIG. 4. The example object code 150-2 further includes example object code 820, which the compiler 152 generated to implement the instruction 152 in FIG. 4. The example object code 150-2 further includes example object code 825, which the compiler 152 generated to implement the instruction I81 in FIG. 5.

Figure 9:
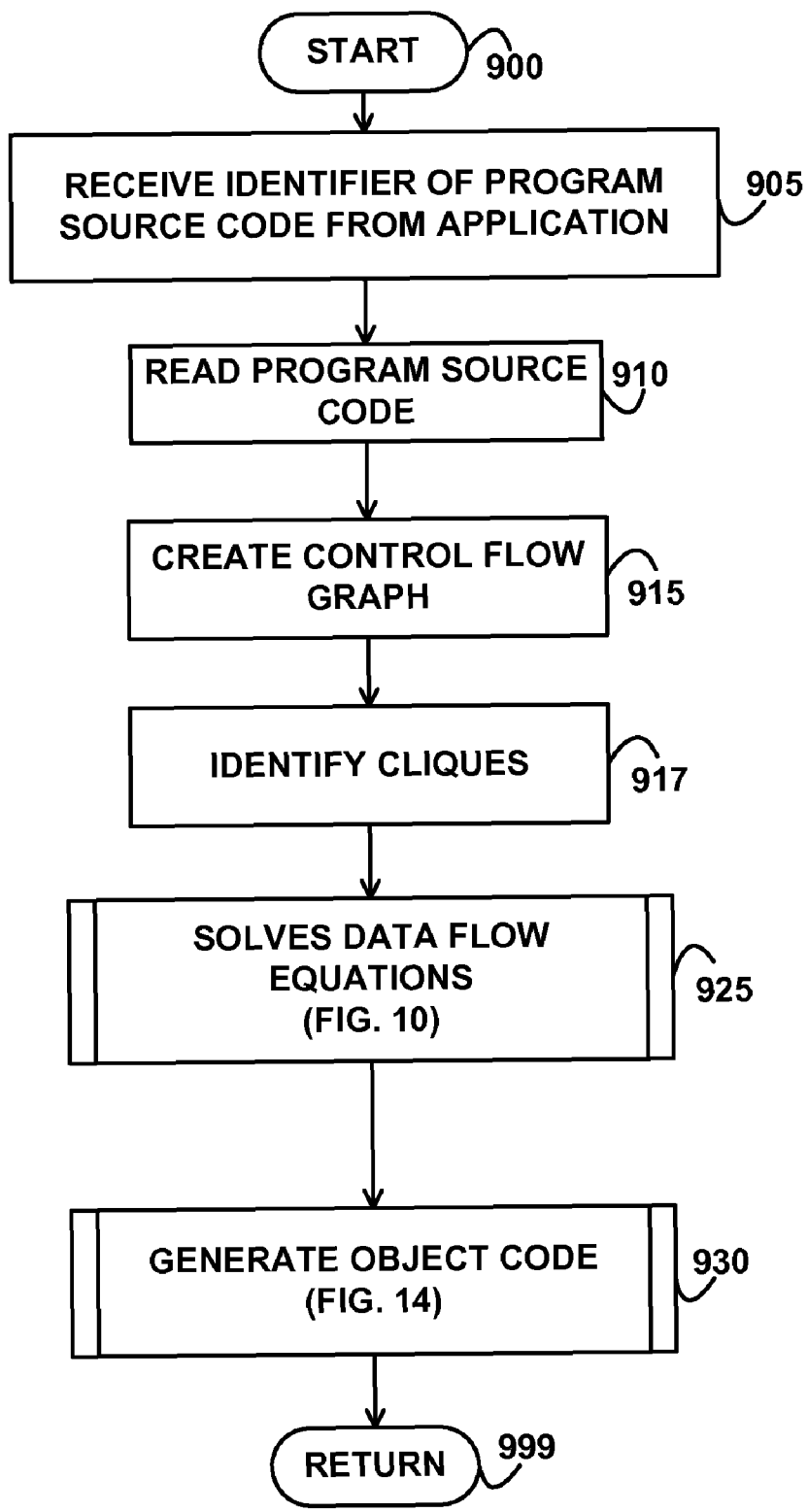
FIG. 9 depicts a flowchart of example processing for a compiler, according to an embodiment of the invention.

FIG. 9 depicts a flowchart of example processing for a compiler, according to an embodiment of the invention. Control begins at block 900.

Control then continues to block 905 where the compiler 152 receives a command that specifies an identifier of the program source code 150-1. In an embodiment, the compiler 152 receives the command from the user via a user interface or from the application 158, such as an IDE (Integrated Development Environment), and the command instructs the compiler 152 to compile or translate the program source code 150-1 and generate the object code 150-2. Control then continues to block 910 where, in response to (as a result of and as caused by) receiving the command and the identifier, the compiler 152 reads the program source code 150-1 that is identified by the received identifier. Control then continues to block 915 where the compiler 152 creates the control flow graph 154. Control then continues to block 917 where the compiler 152 identifies cliques of instructions in the program, as previously described above with reference to FIGS. 4, 5, 6, and 7. In an embodiment, the compiler 152 identifies cliques by including in a clique for each basic block all those instructions (one or more) in that basic block that (if and when executed as predicted by the compiler) set separate constants into separate variables.

Control then continues to block 925 where the compiler 152 solves a system of data flow equations, as further described below with reference to FIG. 10. Control then continues to block 930 where the compiler 152 generates the object code 150-2, as further described below with reference to FIG. 14. The object code 150-2 then executes on the processor 101. Control then continues to block 999 where the logic of FIG. 9 returns.

Figure 10:
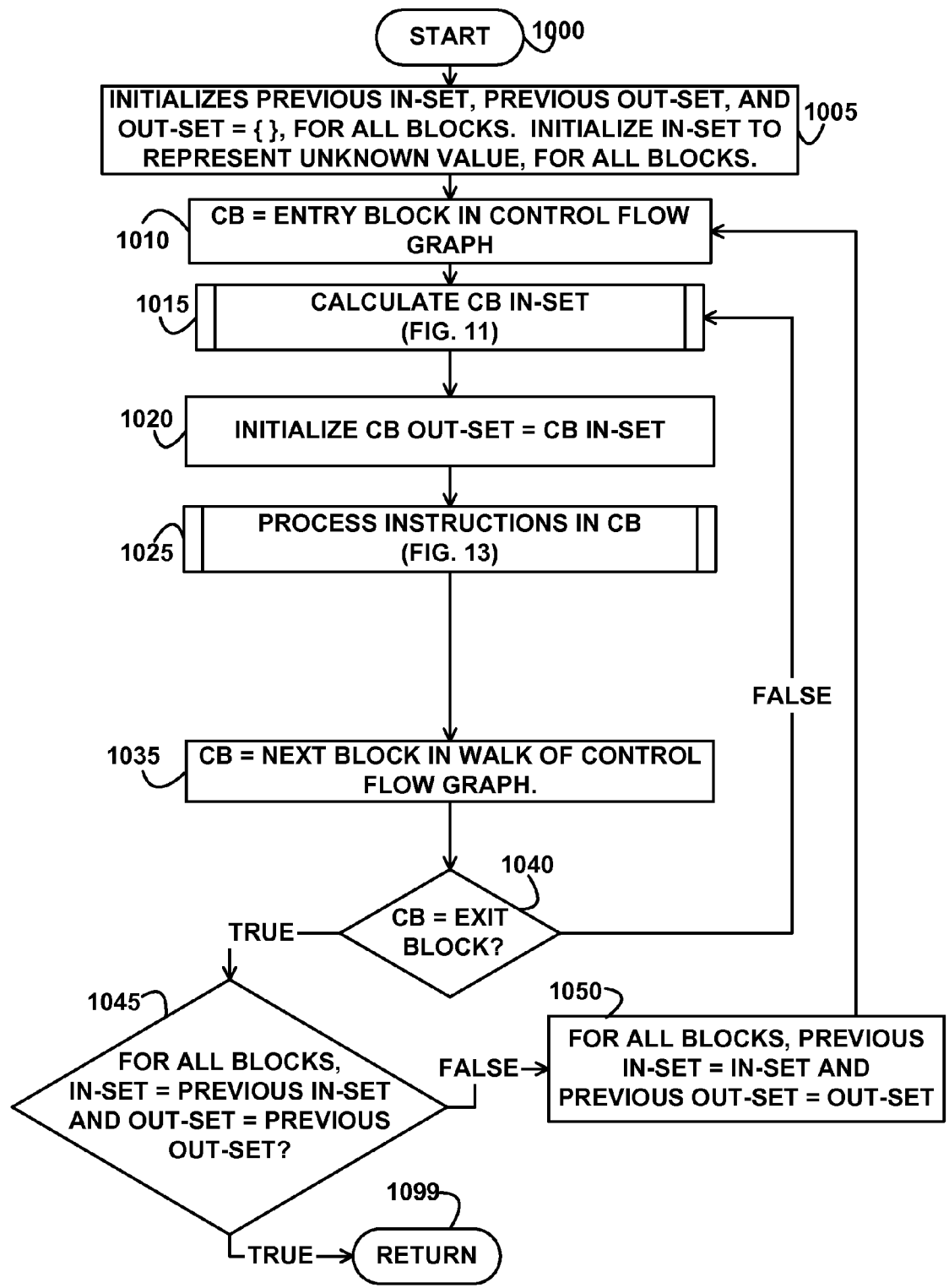
FIG. 10 depicts a flowchart of example processing for solving data flow equations, according to an embodiment of the invention.

FIG. 10 depicts a flowchart of example processing for solving data flow equations, which results in the compiler creating in-sets and out-sets, according to an embodiment of the invention. Control begins at block 1000. Control then continues to block 1005 where the compiler 152 initializes the previous in-sets, the previous out-sets, and the out-sets to be null, for all basic blocks in the control flow graph 154. A set that is null has no members (no statements) or sub-cliques. The compiler 152 initializes the in-sets for all basic blocks in the control flow graph to contain, for each variable, a value representing an unknown sub-clique. Control then continues to block 1010 where the compiler 152 sets the current basic block (CB) to be the entry basic block in the control flow graph 154.

Control then continues to block 1015 where the compiler 152 calculates the in-set for the current basic block, as further described below with reference to FIG. 11.

Control then continues to block 1020 where the compiler 152 initializes the out-set for the current basic block to be the in-set for the current basic block. Control then continues to block 1025 where the compiler 152 processes instructions in the current basic block, which results in potentially modifying the out-set for the current basic block, as further described below with reference to FIG. 13. Control then continues to block 1035 where the compiler 152 sets the current basic block to be the next basic block in a walk of the control flow graph 154.

In various embodiments, the compiler 152 chooses the next basic block that is next in a breadth-first walk of the control flow graph 154, a depth-first walk of the control flow graph 154, an iterative deepening depth-first walk of the control flow graph 154, or any other type of walk of the control flow graph 154.

A breadth-first walk is a graph search algorithm that begins at the entry node of the control flow graph 154 and searches, reads, walks, explores, analyzes, or processes all the neighboring nodes in the control flow graph 154. Then, for each of those nearest nodes, the breadth-first walk algorithm explores their unexplored neighbor nodes, and so on, until the breadth-first walk algorithm reaches the exit node of the control flow graph 154. The breadth-first walk algorithm is an uninformed search algorithm, in that it examines all nodes of the graph systematically in the order specified by the breadth-first walk algorithm. That is, the breadth-first walk algorithm exhaustively searches or walks the entire control flow graph 154.

Control then continues to block 1040 where the compiler 152 determines whether the current basic block equals the exit basic block in the control flow graph 154. If the determination at block 1040 is true, then current basic block is the exit basic block, so control continues to block 1045 where the compiler 152 determines, whether the in-sets equal the previous in-sets and the out-sets equal the previous out-sets, for all basic blocks in the control flow graph 154.

If the determination at block 1045 is true, then the in-set equals the previous in-set and the out-set equals the previous out-set, for all basic blocks in the control flow graph 154, so a steady state for the in-sets and the out-sets has been reached. That is, the in-sets and the out-sets did not change between the successive or consecutive passes or iterations of the walks (that start at block 1010) of the basic blocks, so no more passes or iterations of walks of the basic blocks are needed, so control continues to block 1099 where the logic of FIG. 10 returns.

If the determination at block 1045 is false, then at least one in-set does not equal its previous in-set or at least one out-set does not equal its previous out-set, so a steady state for the in-sets and the out-sets has not been reached. That is, at least one in-set or at least one out-set did change between the successive or consecutive passes or iterations of the walks of the basic blocks, so another pass or iteration of walks of the basic blocks is needed, so control continues to block 1050 where the compiler 152 sets the previous in-set to be the in-set and sets the previous out-set to be the out-set, for all basic blocks in the control flow graph 154.

Control then returns to block 1010 where the compiler 152 initializes the current basic block to be the entry basic block of the control flow graph 154, and the compiler 152 then repeats the walk of the control flow graph 154 (performs another pass), as previously described above.

If the determination at block 1040 is false, then the current basic block is not the exit basic block of the control flow graph 154, so control returns to block 1015 where the compiler 152 repeats the processing previously described above using the new current basic block.

Figure 11:
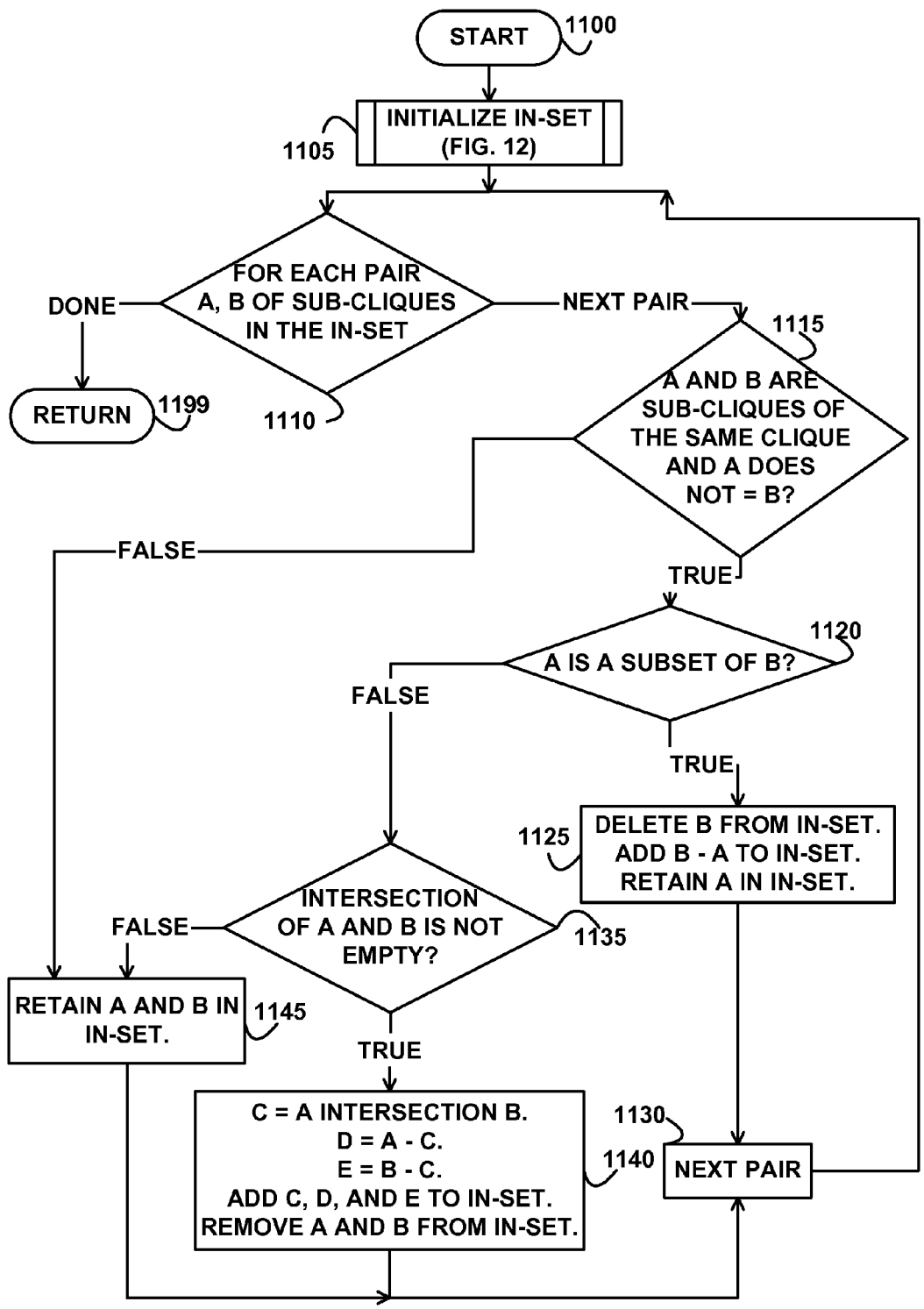
FIG. 11 depicts a flowchart of example processing for creating an in-set for a basic block, according to an embodiment of the invention.

FIG. 11 depicts a flowchart of example processing for creating an in-set for the current basic block, according to an embodiment of the invention. Control begins at block 1100. Control then continues to block 1105 where the compiler 152 initializes the in-set for the current basic block, as further described below with reference to FIG. 12.

Control then continues to block 1110 where the compiler 152 begins performing processing that iterates for each pair of first (A) and second sub-cliques (B) in the in-set for the current basic block. So long as a pair of first (A) and second sub-cliques (B) exists in the in-set that have not been processed by the loop that starts at block 1110, control continues from block 1110 to block 1115 where the compiler 152 determines whether the first sub-clique A and the second sub-clique B are both sub-cliques of the same clique and A is not equal to B. If the determination at block 1115 is true, then the first sub-clique A and the second sub-clique B are both sub-cliques of the same clique and A is not equal to B, so control continues to block 1120 where the compiler 152 determines whether the sub-clique A is a subset of the sub-clique B. If the determination at block 1120 is true, then the sub-clique A is a subset of sub-clique B, so control continues to block 1125 where the compiler 152:

(a) deletes sub-clique B from the in-set of the current basic block;

(b) adds the sub-clique formed by the set operation B−A to the in-set of the current basic block (B−A denotes the relative complement of A in B, which is also called the set theoretic difference of B and A, the result of which is the set of all elements that are members of B, but not members of A); and (c) retains the sub-clique A in the in-set of the current basic block.

Control then continues to block 1130 where the compiler begins processing the next unprocessed pair A, B of the sub-cliques in the in-set of the current basic block. Control then returns to block 1110, as previously described above.

If the determination at block 1120 is false, then neither the sub-clique A nor the sub-clique B is a subset of the other, so control continues to block 1135 where the compiler determines whether the intersection of the sub-clique A and the sub-clique B is non-empty. If the determination at block 1135 is true, then intersection of the sub-clique A and the sub-clique B is non-empty, so control continues to block 1140 where the compiler 152:

(a) creates a sub-clique C consisting of the intersection of the sub-clique A and the sub-clique B;

(b) removes the members of the sub-clique C from the sub-clique A to create a sub-clique D;

(c) removes members of the sub-clique C from the sub-clique B to create a sub-clique E;

(d) adds the sub-clique C, the sub-clique D, and the sub-clique E to the in-set of the current basic block; and (e) removes the sub-clique A and the sub-clique B from the in-set of the current basic block.

Control then continues to block 1130, as previously described above.

If the determination at block 1135 is false, then the intersection of the sub-cliques A and B is empty (i.e., A and B are disjoint), so control continues to block 1145 where the compiler retains the sub-clique A and the sub-clique B in the in-set of the current basic block. Control then continues to block 1130, as previously described above.

If the determination at block 1115 is false, then the sub-clique A and the sub-clique B are not sub-cliques of the same clique or A is equal to B, so control continues to block 1145 where the compiler retains the sub-clique A and the sub-clique B in the in-set of the current basic block. Control then continues to block 1130, as previously described above.

After each pair of sub-cliques A and B in the in-set have been processed by the loop that starts at block 1110, control continues from block 1110 to block 1199 where the logic of FIG. 11 returns.

Figure 12:
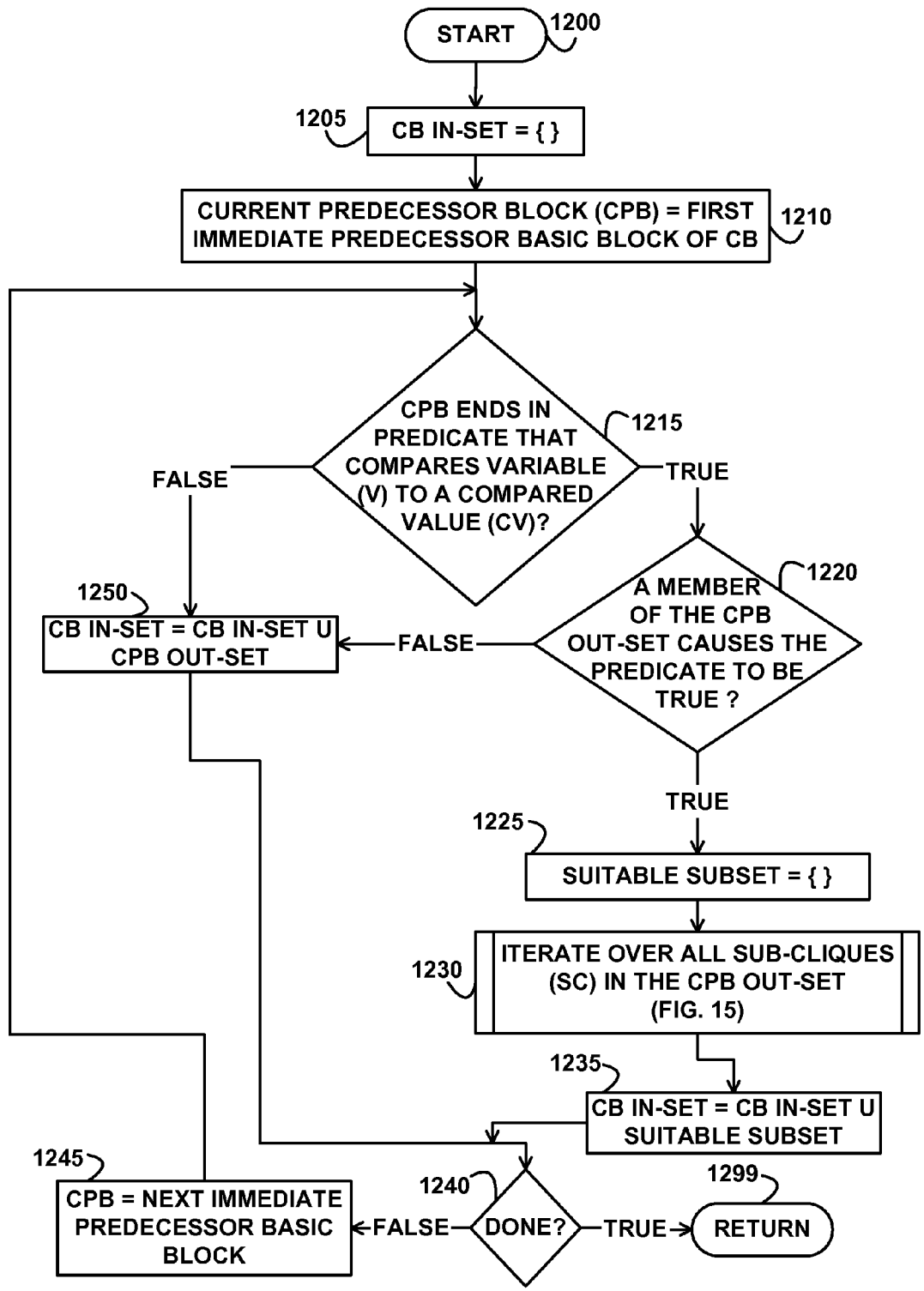
FIG. 12 depicts a flowchart of example processing for initializing an in-set, according to an embodiment of the invention.

FIG. 12 depicts a flowchart of example processing for initializing an in-set, according to an embodiment of the invention. Control begins at block 1200. Control then continues to block 1205 where the compiler sets the current basic block in-set to be { } (the null set). Control then continues to block 1210 where the compiler sets the current predecessor basic block (CPB) to be the first immediate predecessor basic block of the current basic block (CB) in the control flow graph 154.

Control then continues to block 1215 where the compiler determines whether the last instruction (in control flow order) within the current predecessor basic block is a predicate instruction that compares a predicate variable (V) to a compared value (CV). In various embodiments, the predicate variable V may be any variable, pointer, register, or storage location read by the program (when executed), the compared value may be any constant or expression, and the comparison may be any logical comparison, such as less than, greater than, equal to, greater than or equal to, or less than or equal to, which can be evaluated to either true or false, resulting in a change of control flow.

If the determination at block 1215 is true, then the last instruction (in control flow order) within the current predecessor basic block is a predicate instruction that compares a predicate variable (V) to a compared value (CV) (the compared value may be determined from a combination of one or more values, constants, variables, and arithmetic or logical operators), so control continues to block 1220 where the compiler 152 determines whether the assignment done by one or more sub-clique members in the current predecessor basic block out-set (when executed) causes the predicate comparison of the predicate variable V to the compared value (CV) to evaluate to true.

If the determination at block 1220 is true, then the assignment done by one or more sub-clique members in the current predecessor basic block out-set (when executed) cause the predicate comparison of the predicate variable V to the compared value (CV) to evaluate to true, so control continues to block 1225 where the compiler sets the suitable subset to be the null set. Control then continues to block 1230 where the compiler iterates over all sub-cliques (SC) in the current predecessor basic block out-set, as further described below with reference to FIG. 15.

Control then continues to block 1235 where the compiler sets the current basic block in-set to be the current basic block in-set union the suitable subset. Control then continues to block 1240 where the compiler determines whether all immediate predecessor basic blocks of the current basic block have been processed by the loop that starts at block 1215. If the determination at block 1240 is true, then all immediate predecessor basic blocks of the current basic block have been processed by the loop that starts at block 1215, so control continues to block 1299 where the logic of FIG. 12 returns.

If the determination at block 1240 is false, then all immediate predecessor basic blocks of the current basic block have not been processed by the loop that starts at block 1215, so control continues to block 1245 where the compiler sets the current predecessor basic block to the next immediate predecessor basic block of the current basic block in the control flow graph 154. Control then returns to block 1215 where the compiler performs the processing of the loop that starts at block 1215 for the next immediate predecessor basic block.

If the determination at block 1220 is false, then the assignment done by one or more sub-clique members in the current predecessor basic block out-set (when executed) does not cause the predicate comparison of the predicate variable V to the compared value (CV) to evaluate to true, so control continues to block 1250 where the compiler 152 sets the current basic block in-set to be the current basic block in-set union the current predecessor basic block out-set. Control then continues to block 1240 where the compiler 152 determines whether all immediate predecessor basic blocks have been processed by the loop that starts at block 1215, as previously described above.

If the determination at block 1215 is false, then the last instruction (in control flow order) within the current predecessor basic block is not a predicate instruction that compares a variable (V) to a compared value (CV), so control continues to block 1250 where the compiler 152 sets the current basic block in-set to be the current basic block in-set union the current predecessor basic block out-set, as previously described above.

Figure 13:
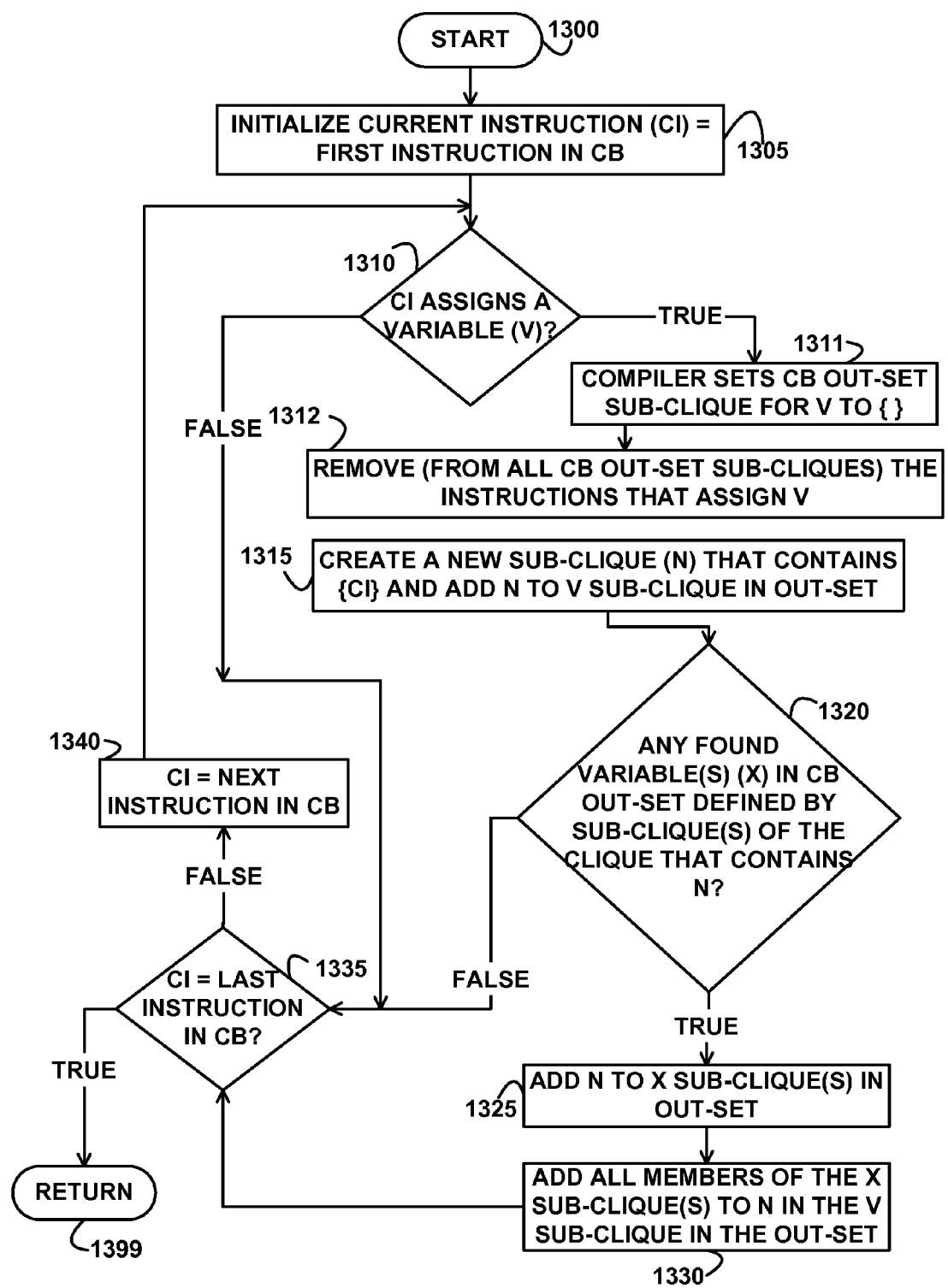
FIG. 13 depicts a flowchart of example processing for processing instructions in a basic block, according to an embodiment of the invention.

FIG. 13 depicts a flowchart of example processing of the instructions within a basic block, according to an embodiment of the invention. Control begins at block 1300. Control then continues to block 1305 where the compiler 152 initializes the current instruction (CI) to be first instruction in the current basic block. Control then continues to block 1310 where the compiler 152 determines whether the current instruction (when executed, as predicted by the compiler 152) performs an assignment of any variable, register, or storage location V.

If the determination at block 1310 is true, then the current instruction (when executed, as predicted by the compiler 152) performs an assignment of a variable, a register, or a storage location V whether directly or indirectly via an aliased write, so control continues to block 1311 where the compiler 152 sets the out-set sub-clique for the variable V to be { } (the null set), indicating that no sub-cliques set the variable V.

Control then continues to block 1312 where the compiler 152 removes, from all current basic block out-set sub-cliques, the instructions that assign (write to, set, or define, as predicted by the compiler 152) the variable V.

Control then continues to block 1315 where the compiler 152 creates a new sub-clique (N) that contains or identifies the current instruction ({CI}) and adds N to the V sub-clique in the out-set for the current basic block. The compiler 152 further sets the designated instruction 715 to identify the instruction that defines the variable V.

Control then continues to block 1320 where the compiler 152 determines whether any found variables, storage locations, or registers (X) in the current basic block out-set (other than V) are defined by sub-clique(s) of the clique that contains N. If the determination at block 1320 is true, then a found variable, storage location, or register (X) exists in the current basic block out-set that is defined by sub-clique(s) of the clique that contains N, so control continues to block 1325 where the compiler 152 adds N to the X sub-clique(s) in the out-set. Control then continues to block 1330 where the compiler 152 adds all members of the X sub-clique(s) to N in the V sub-clique in the out-set for the current basic block.

Control then continues to block 1335 where the compiler 152 determines whether the current instruction is the last instruction (in control flow order) in the current basic block. If the determination at block 1335 is true, then the current instruction is the last instruction (in control flow order) in the current basic block, so control continues to block 1399 where the logic of FIG. 13 returns.

If the determination at block 1335 is false, then the current instruction is not the last instruction (in control flow order) in the current basic block, so control continues to block 1340 where the compiler 152 sets the current instruction to be the next instruction (in control flow order) in the current basic block. Control then returns to block 1310 where the compiler 152 begins processing the next current instruction, as previously described above.

If the determination at block 1320 is false, then X is not found in the current basic block out-set that is defined by sub-clique(s) of the clique that contains N, so control continues to block 1335 without performing the processing of blocks 1325 and 1330.

If the determination at block 1310 is false, then the current instruction does not perform an assignment to V (instead, the current instruction performs a compare, branch, etc), so control continues to block 1335, as previously described above, without performing the processing of blocks 1311, 1312, 1315, 1325, and 1330.

To illustrate the processing of FIG. 13, consider a current basic block that contains the instructions: V1=I1; V2=I2; V3=I3, where {I1, I2, I3} is a clique, and the in-set of the current basic block before the compiler 152 starts processing any instructions is: V1: {UNKNOWN_VALUE}, V2: {UNKNOWN_VALUE}, V3: {UNKNOWN_VALUE}, where UNKNOWN_VALUE is the virtual instruction previously described above.

That is, each variable V1, V2, and V3 is set by the distinguished sub-clique consisting of the virtual instruction, indicating that the compiler 152 knows nothing at this point (at the processing of the current basic block) about what actual value may be assigned to each variable.

(In the text below, a clique C "contains" a sub-clique N if N is a sub-clique of C.) The compiler 152 processes the instruction V1=I1 as follows. At blocks 1020 and 1311, the compiler 152 sets the out-set to: V1: { }, V2: {UNKNOWN_VALUE} V3: {UNKNOWN_VALUE}, and sets V1's sub-clique to { }.

At block 1320, the compiler 152 creates a new sub-clique (N) which includes the assignment of I1 to V1, and the compiler 152 includes that instruction in the outset for V1, yielding an out-set for the current basic block of: V1 {{I1}} V2: {UNKNOWN_VALUE} V3: {UNKNOWN_VALUE}.

At block 1311, the compiler 152 determines if any other variables in the out-set (V2 and V3) are set by sub-cliques of the clique that containing N. There are none because both V2 and V3 are set by UNKNOWN_VALUE.

At block 1315, the compiler 152 process V2=I2 as follows. First, the compiler 152 set the outset for the current basic block to: V1:{{I1}} V2: {} V3: {UNKNOWN_VALUE}. Next, the compiler 152 creates a new sub-clique N that includes the assignment of I2 to V2, and the compiler 152 include that assignment instruction in the outset for V2, yielding the out-set for the current basic block as: V1: {{I1}} V2: {{I2}}, V3: {UNKNOWN_VALUE}.

At bock 1320, the compiler 152 determines if any of the other variables in the out-set (V1 and V3) are set by sub-cliques of the clique containing N. There is one: the sub-clique member I1 sets V1. To the sub-clique (X is V1 in this case), at block 1325, the compiler I52 adds the members of N resulting an out-set of: V1: {{I1,I2}}, V2: {{I2}} V3: {UNKNOWN_VALUE}.

At block 1330, the compiler 152 adds to N in the out-set all the members of X, yielding an out-set of: V1: {{I1,I2}} V2{{I1,I2}} V3: {UNKNOWN_VALUE}.

Finally, the compiler 152 processes the instruction V3=I3 as follows. At block 1311, the compiler 152 sets the outset for the current basic block to: V1: {{I1,I2}} V2: {{I1,I2}} V3: { }.

At block 1315, the compiler 152 creates a new sub-clique (N) which includes the assignment of I3 to V3, and the compiler 152 includes that in the outset for V3, yielding the out-set: V1: {{I1,I2}} V2: {{I1,I2}} V3:{{I3}}.

At block 1320, the compiler 152 determines if any other variables in the out-set (V1 and V2) are set by sub-cliques of the clique containing N. There is one sub-clique and it appears in the outset for two variables. The first variable the compiler 152 considers is V1, and the sub-clique (X) that has a member that sets V1 is {I1,I2}. To the sub-clique (X), at block 1325, the compiler 152 first add the members of N resulting in an out-set of: V1: {{I1,I2,I3}} V2: {{I1,I2}} V3: {{I3}}.

At block 1330, the compiler 152 adds all the members of (X) to N resulting in the out-set for the current basic block: V1: {{I1, I2, I3}} V2: {I1,I2} V3: {{I1, I2, I3}}.

The second variable the compiler 152 considers is V2, and the sub-clique (X) that has a member that sets V2 is (also) {I1,I2}. At block 1325, the compiler 152 adds to X the members of N and, at block 1330, adds to N the members of X, resulting in the final outset for the current basic block of: V1: {{I1, I2, I3}} V2: {{I1, I2, I3}} V3: {{I1, I2, I3}}.

The compiler 152 has processed the instruction assigning the last instruction in the clique to the appropriate variable. At this point, all the variables assigned to by instructions in the clique are assigned to by members of the sub-clique consisting of all the members of the clique. Prior to processing this last instruction, the outset of V1 and V2 contained sub-cliques that were smaller than the sub-clique containing all members and V3 was not assigned to by any member of a sub-clique of the clique.

The compiler 152 builds the sub-cliques as the compiler 152 processes individual instructions rather than setting all variables to the maximal sub-clique at the assignment of the last instruction in a clique because the compiler 152 needs accurate information at every program point, not simply at the end of cliques or at the end of basic blocks.

To further illustrate the processing of FIG. 13, consider an example where the out-set for the current basic block contains T: { ... {$I_T, I_U, I_V$} ... } U: { ... {$I_T, I_U, I_V$}, ... } V: { ... {$I_T, I_U, I_V$}, ... }, where T, U, and V are variables, $I_T$ is an instruction that sets the variable T, $I_U$ is an instruction that sets the variable U, and $I_V$ is an instruction that sets the variable V. If the compiler 152 encounters a current instruction in the current basic block that assigns a value to the variable V, then via the processing of FIG. 13, the compiler 152 transforms the out-set for the current basic block into T: { ... {$I_T, I_U$}, ... } U: { ..., {$I_T, I_U$}, ... } V: { }). Thus, the compiler 152 sets the sub-clique out-set for the variable V to { } (via the processing of block 1311), removes the instruction $I_V$ from the out-set sub-clique for the variable T (via the processing of block 1312), and removes the instruction $I_V$ from the out-set sub-clique for the variable U (via the processing of block 1312).

Figure 14:
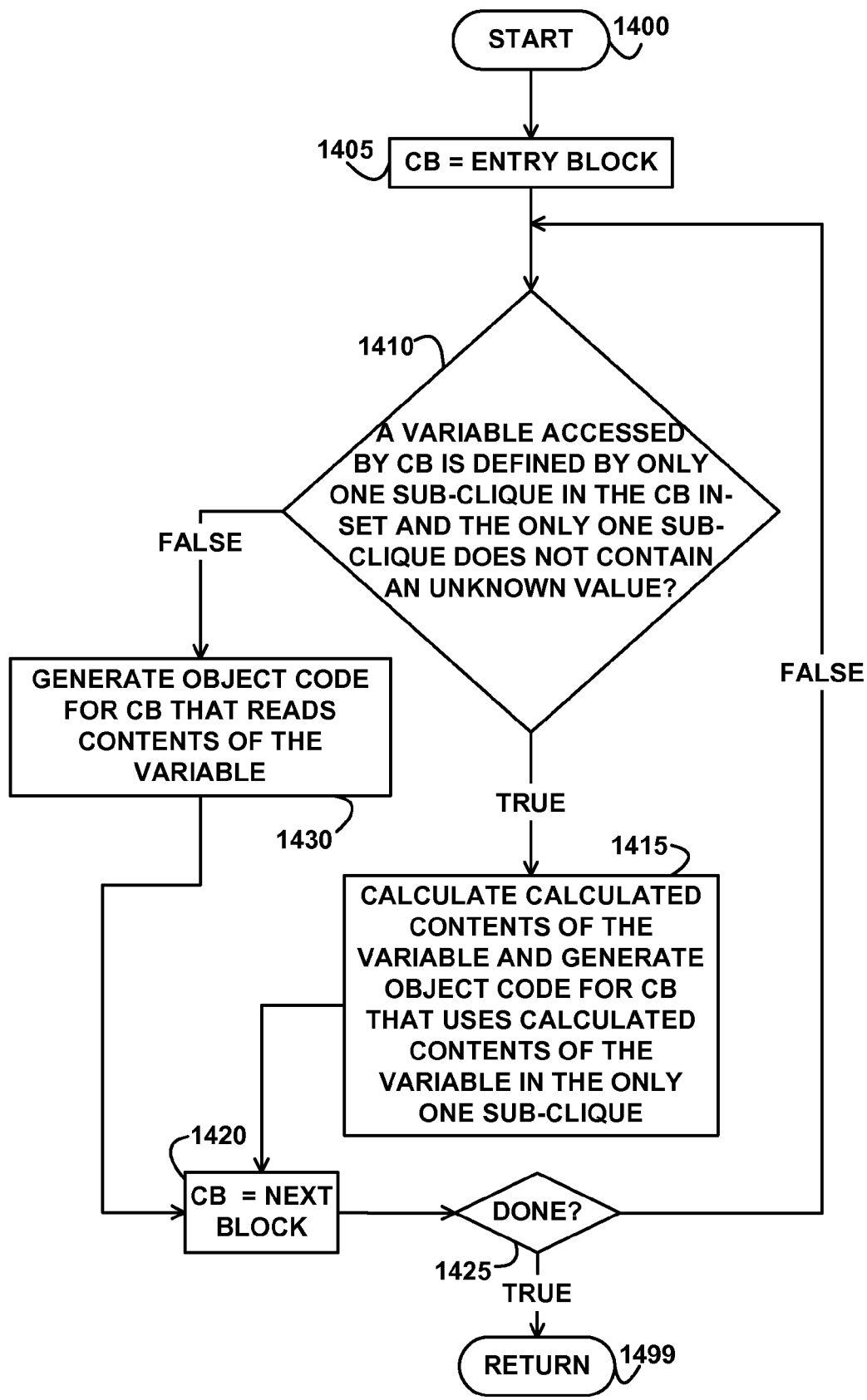
FIG. 14 depicts a flowchart of example processing for generating object code, according to an embodiment of the invention.

FIG. 14 depicts a flowchart of example processing for generating object code, according to an embodiment of the invention. Control begins at block 1400.

Control then continues to block 1405 where the compiler 152 sets the current basic block to be the entry basic block in the control flow graph 154. Control then continues to block 1410 where the compiler 152 determines whether a current variable accessed (a variable, pointer, register, or memory location whose contents are read) by the current basic block (when the current basic block is executed, as predicted by the compiler) is defined (written) by only one sub-clique in the in-set for the current basic block (when the current basic block is executed, as predicted by the compiler 152) and the only one sub-clique does not contain an unknown value. In an embodiment, a current variable accessed by the current basic block is defined by only one sub-clique in the in-set because the current variable and a predicate variable compared by a predicate block are defined by a same sub-clique and a member of that same sub-clique (when executed) sets the predicate variable to a predicate value that causes execution control flow to take (traverse or move along) a path in the control flow graph 154 from the predicate block to the current block.

If the determination at block 1410 is true, then a current variable accessed (a variable, pointer, register, or memory location whose contents are read) by the current basic block (when the current basic block is executed, as predicted by the compiler 152) is defined (written) by only one sub-clique in the in-set for the current basic block (when the current basic block is executed, as predicted by the compiler 152) and the only one sub-clique does not contain an unknown value, so control continues to block 1415 where the compiler 152 generates object code that implements the instructions of the current basic block. The compiler 152 calculates calculated contents of the current variable based on the definition of the current variable in the only one sub-clique and generates object code that uses (loads or stores) the calculated contents instead of reading the contents of the variable.

For example, with reference to FIG. 3 at the basic block 205-6, the compiler 152 determines that J: {{I6, I7}} provides the only the definition of the variable J that is in the in-set 156-8 of the basic block 205-6. In response this definition of J in the in-set, the compiler 152 recasts the instruction V=J+2 as the instruction V=22 and generates the object code 805 to implement the recast instruction by generating code that loads the constant "22" (after the compiler calculates 20+2=22) into the variable V instead of generating code that (when executed) reads the contents of the variable J, adds that read contents to the constant "2," stores the result to the variable V. Similarly, the compiler 152 determines that I: {I5} provides the only definition of the variable I in the inset of the basic block 205-6, so the compiler 152 recasts the instruction V=I+1 as V=1 and generates code that loads the constant "1" into the variable V instead of generating code that reads the contents of the variable I.

Control then continues to block 1420 where the compiler 152 sets the current basic block to be the next basic block that needs object code generation in the control flow graph. Control then continues to block 1425 where the compiler 152 determines whether object code generation is complete. If the determination at block 1425 is true, then object code generation is complete, so control continues to block 1499 where the logic of FIG. 14 returns.

If the determination at block 1425 is false, then object code generation is not complete, so control returns to block 1410 where processing for the new current basic block is initiated, as previously described above.

If the determination at block 1410 is false, then the current basic block does not access a current variable, or a current variable accessed (a variable, pointer, register, or memory location whose contents are read) by the current basic block (when the current basic block is executed, as predicted by the compiler 152) is not defined (written) by only one sub-clique in the in-set for the current basic block (when the current basic block is executed, as predicted by the compiler 152), or the only one sub-clique does contain an unknown value, so control continues to block 1430 where the compiler 152 generates object code that implements the instructions of the current basic block. The compiler 152 generates object code that reads the contents of the current variable or memory location and uses that read contents, such as the object code 825. Control then continues to block 1420, as previously described above.

Figure 15:
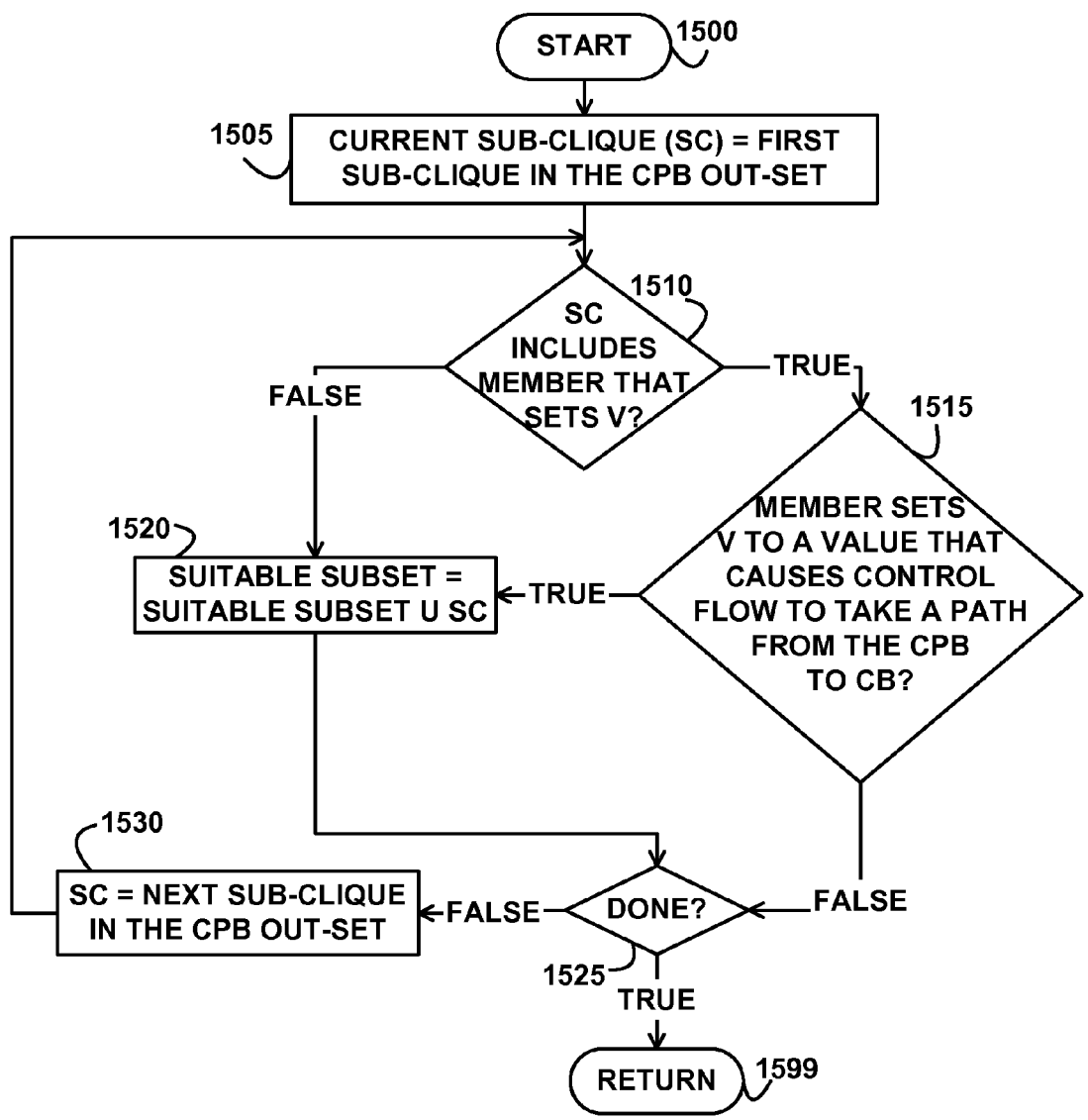
FIG. 15 depicts a flowchart of example processing for iterating over sub-cliques in a predecessor block out-set, according to an embodiment of the invention.

FIG. 15 depicts a flowchart of example processing for iterating over sub-cliques in a predecessor block out-set, according to an embodiment of the invention. Control begins at block 1500. Control then continues to block 1505 where the compiler 152 sets the current sub-clique (SC) to be the first sub-clique in the current predecessor basic block out-set. Control then continues to block 1510 where the compiler 152 determines whether the current sub-clique includes a member that sets the variable V (if and when the current sub-clique is executed, as predicted by the compiler 152). If the determination at block 1510 is true, then the current sub-clique includes a member that sets the variable V, so control continues to block 1515 where the compiler 152 determines whether the member sets the variable V to a predicate value that causes the predicate comparison to evaluate to a logical value that causes the control flow of the program to follow a path from the current predicate block to the current block (when the program is executed, as predicted by the compiler).

If the determination at block 1515 is true, then the member sets the variable V to a value that causes the predicate comparison to evaluate to a logical value that causes the control flow of the program to follow a path from the current predicate block to the current block (when the program is executed, as predicted by the compiler), so control continues to block 1520 where the compiler 152 sets the suitable subset to be the suitable subset union the current sub-clique. Control then continues to block 1525 where the compiler 152 determines whether all sub-cliques in the current predecessor basic block out-set have been processed by the loop that starts at block 1510.

If the determination at block 1525 is true, then all sub-cliques in the current predecessor basic block out-set have been processed by the loop that starts at block 1510, so control continues to block 1599 where the logic of FIG. 15 returns.

If the determination at block 1525 is false, then not all sub-cliques in the current predecessor block out-set have been processed by the loop that starts at block 1510, so control continues to block 1530 where the compiler 152 sets the current sub-clique to be the next unprocessed sub-clique in the current predecessor basic block out-set. Control then returns to block 1510 where the compiler 152 begins processing the next sub-clique, as previously described above.

If the determination at block 1515 is false, then the member does not set the variable V to a value that causes the predicate comparison to evaluate to a logical value that causes the control flow of the program to follow a path from the current predicate block to the current block (when the program is executed, as predicted by the compiler), so control continues to block 1525, as previously described above.

If the determination at block 1510 is false the current sub-clique does not include a member that sets the variable V, so control continues to block 1520, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method for generating object code that uses calculated contents for a current variable determined from a definition of a predicate variable, comprising:
   determining, using a processor, a predicate condition that compares a predicate variable to a compared value, wherein the predicate condition is in a predicate block that exists on a path to a current block that accesses a current variable;
   deciding, using a processor, whether the current variable and the predicate variable are defined by a same sub-clique and whether a member of the same sub-clique sets the predicate variable to a predicate value that causes control flow to take the path from the predicate block to the current block; and
   upon a determination that the current variable and the predicate variable are defined by the same sub-clique and the member of the same sub-clique sets the predicate variable to the predicate value that causes control flow to take the path from the predicate block to the current block, calculating calculated contents for the current variable and generating first object code that loads the calculated contents.

2. The method of claim 1, further comprising:
   upon a determination that the current variable and the predicate variable are not defined by the same sub-clique, generating second object code for the current block that reads the current variable.

3. The method of claim 2, further comprising:
   upon a determination that the current variable and the predicate variable are defined by the same sub-clique and the member of the same sub-clique does not set the predicate variable to the predicate value that causes control flow to take the path from the predicate block to the current block, generating the second object code for the current block that reads the current variable.

4. The method of claim 1, wherein the deciding further comprises:
upon a determination that a member of an out-set of the predicate block causes the predicate condition to be true, setting an in-set of the current block to be a union of all sub-cliques in the out-set of the predicate block that include members that set the predicate variable to the predicate value that cause the control flow to take the path from the predicate block to the current block.

5. The method of claim 4, wherein the deciding further comprises:
upon a determination that the member of the out-set of the predicate block does not cause the predicate condition to be true, setting the in-set of the current block to be the out-set of the predicate block.

6. The method of claim 5, wherein the deciding further comprises:
deciding whether the current variable is defined by only one sub-clique in the in-set of the current block.

7. The method of claim 1, wherein the same sub-clique comprises a plurality of load value instructions, wherein one of the plurality of load value instructions defining contents of its variable implies that all of the plurality of load value instructions define respective contents of their respective variables.

8. A computer program product for generating object code that uses calculated contents for a current variable determined from a definition of a predicate variable, the computer program product comprising a computer readable storage memory having computer readable program code embodied therewith, the computer readable program code comprising:
computer readable program code configured to determine a predicate condition that compares a predicate variable to a compared value, wherein the predicate condition is in a predicate block that exists on a path to a current block that accesses a current variable;
computer readable program code configured to decide whether the current variable and the predicate variable are defined by a same sub-clique and whether a member of the same sub-clique sets the predicate variable to a predicate value that causes control flow to take the path from the predicate block to the current block; and
computer readable program code configured to, upon a determination that the current variable and the predicate variable are defined by the same sub-clique and the member of the same sub-clique sets the predicate variable to the predicate value that causes control flow to take the path from the predicate block to the current block, calculate calculated contents for the current variable and generating first object code that loads the calculated contents.

9. The computer program product of claim 8, further comprising computer readable program code configured to:
upon a determination that the current variable and the predicate variable are not defined by the same sub-clique, generate second object code for the current block that reads the current variable.

10. The computer program product of claim 9, further comprising computer readable program code configured to:
upon a determination that the current variable and the predicate variable are defined by the same sub-clique and the member of the same sub-clique does not set the predicate variable to the predicate value that causes control flow to take the path from the predicate block to the current block, generate the second object code for the current block that reads the current variable.

11. The computer program product of claim 8, wherein the computer readable program code configured to decide further comprises:
upon a determination that a member of an out-set of the predicate block causes the predicate condition to be true, computer readable program code configured to set an in-set of the current block to be a union of all sub-cliques in the out-set of the predicate block that include members that set the predicate variable to the predicate value that cause the control flow to take the path from the predicate block to the current block.

12. The computer program product of claim 11, wherein the computer readable program code configured to decide further comprises:
upon a determination that the member of the out-set of the predicate block does not cause the predicate condition to be true, computer readable program code configured to set the in-set of the current block to be the out-set of the predicate block.

13. The computer program product of claim 12, wherein the computer readable program code configured to decide further comprises:
computer readable program code configured to decide whether the current variable is defined by only one sub-clique in the in-set of the current block.

14. The computer program product of claim 8, wherein the same sub-clique comprises a plurality of load value instructions, wherein one of the plurality of load value instructions defining contents of its variable implies that all of the plurality of load value instructions define respective contents of their respective variables.

15. A computer system for generating object code that uses calculated contents for a current variable determined from a definition of a predicate variable, comprising:
a processor; and
memory connected to the processor, wherein the memory is encoded with instructions and wherein the instructions when executed comprise:
instructions for determining a predicate condition that compares a predicate variable to a compared value, wherein the predicate condition is in a predicate block that exists on a path to a current block that accesses a current variable, instructions for deciding whether the current variable and the predicate variable are defined by a same sub-clique and whether a member of the same sub-clique sets the predicate variable to a predicate value that causes control flow to take the path from the predicate block to the current block, wherein the same sub-clique comprises a plurality of load value instructions, wherein one of the plurality of load value instructions defining contents of its variable implies that all of the plurality of load value instructions define respective contents of their respective variables, and
upon a determination that the current variable and the predicate variable are defined by the same sub-clique and the member of the same sub-clique sets the predicate variable to the predicate value that causes control flow to take the path from the predicate block to the current block, instructions for calculating calculated contents for the current variable and generating first object code that loads the calculated contents.

16. The computer system of claim 15, further comprising:
upon a determination that the current variable and the predicate variable are not defined by the same sub-clique, instructions for generating second object code for the current block that reads the current variable.

17. The computer system of claim 16, further comprising:

upon a determination that the current variable and the predicate variable are defined by the same sub-clique and the member of the same sub-clique does not set the predicate variable to the predicate value that causes control flow to take the path from the predicate block to the current block, instructions for generating the second object code for the current block that reads the current variable.

18. The computer system of claim 15, wherein the instructions for deciding further comprises:

upon a determination that a member of an out-set of the predicate block causes the predicate condition to be true, instructions for setting an in-set of the current block to be a union of all sub-cliques in the out-set of the predicate block that include members that set the predicate variable to the predicate value that cause the control flow to take the path from the predicate block to the current block.

19. The computer system of claim 18, wherein the instructions for deciding further comprises:

upon a determination that the member of the out-set of the predicate block does not cause the predicate condition to be true, instructions for setting the in-set of the current block to be the out-set of the predicate block.

20. The computer system of claim 19, wherein the instructions for deciding further comprises:

instructions for deciding whether the current variable is defined by only one sub-clique in the in-set of the current block.

* * * * *